US008942428B2

(12) United States Patent
Snook et al.

(10) Patent No.: US 8,942,428 B2
(45) Date of Patent: Jan. 27, 2015

(54) ISOLATE EXTRANEOUS MOTIONS

(75) Inventors: Gregory Nelson Snook, Sammamish, WA (US); Relja Markovic, Seattle, WA (US); Stephen Gilchrist Latta, Seattle, WA (US); Kevin Geisner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1339 days.

(21) Appl. No.: 12/475,302

(22) Filed: May 29, 2009

(65) Prior Publication Data

US 2010/0278393 A1    Nov. 4, 2010

Related U.S. Application Data

(60) Provisional application No. 61/174,881, filed on May 1, 2009.

(51) Int. Cl.
*G06K 9/00* (2006.01)
*G06F 3/01* (2006.01)

(52) U.S. Cl.
CPC ............... *G06F 3/017* (2013.01); *G06F 3/011* (2013.01); *G06K 9/00335* (2013.01)
USPC ........................... 382/107; 382/103; 382/106

(58) Field of Classification Search
CPC ........................... G06F 9/017; G06K 9/00335
USPC ......... 382/100, 103–107, 118, 159, 170–173, 382/181, 190, 195, 203, 209–210, 226, 228, 382/241, 66, 276–278, 285; 463/5, 8, 463/36–37; 345/143, 156, 158, 418–419, 345/473–474, 629; 356/614, 616; 348/42–43, 48, 77–78, 169, 208.14; 701/24; 715/700, 702, 863
See application file for complete search history.

(56) References Cited

U.S. PATENT DOCUMENTS

| 4,627,620 | A | 12/1986 | Yang |
| 4,630,910 | A | 12/1986 | Ross et al. |

(Continued)

FOREIGN PATENT DOCUMENTS

| CN | 101254344 B | 6/2010 |
| EP | 0583061 A2 | 2/1994 |

(Continued)

OTHER PUBLICATIONS

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

(Continued)

*Primary Examiner* — Hadi Akhavannik
*Assistant Examiner* — Mehdi Rashidian
(74) *Attorney, Agent, or Firm* — Gregg Wisdom; Judy Yee; Micky Minhas

(57) ABSTRACT

A system may receive image data and capture motion with respect to a target in a physical space and recognize a gesture from the captured motion. It may be desirable to isolate aspects of captured motion to differentiate random and extraneous motions. For example, a gesture may comprise motion of a user's right arm, and it may be desirable to isolate the motion of the user's right arm and exclude an interpretation of any other motion. Thus, the isolated aspect may be the focus of the received data for gesture recognition. Alternately, the isolated aspects may be an aspect of the captured motion that is removed from consideration when identifying a gesture from the captured motion. For example, gesture filters may be modified to correspond to the user's natural lean to eliminate the effect the lean has on the registry of a motion with a gesture filter.

21 Claims, 22 Drawing Sheets

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,204,852 B1 | 3/2001 | Kumar et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 * | 7/2001 | Nguyen ........................ 715/863 |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 * | 1/2004 | Jojic et al. ...................... 382/103 |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,027,054 B1 * | 4/2006 | Cheiky et al. ................. 345/473 |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,212,665 B2 * | 5/2007 | Yang et al ...................... 382/159 |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |

(56) References Cited

U.S. PATENT DOCUMENTS

| | | | |
|---|---|---|---|
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,627,139 B2 * | 12/2009 | Marks et al. | 382/103 |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,287,373 B2 * | 10/2012 | Marks et al. | 463/36 |
| 8,325,214 B2 * | 12/2012 | Hildreth | 348/14.03 |
| 8,374,423 B2 * | 2/2013 | Lee et al. | 382/154 |
| 8,427,426 B2 * | 4/2013 | Corson et al. | 345/157 |
| 2003/0132950 A1 | 7/2003 | Surucu | |
| 2003/0219146 A1 * | 11/2003 | Jepson et al. | 382/103 |
| 2004/0046736 A1 * | 3/2004 | Pryor et al. | 345/156 |
| 2004/0135824 A1 * | 7/2004 | Fitzmaurice | 345/856 |
| 2004/0193413 A1 | 9/2004 | Wilson | |
| 2004/0207597 A1 | 10/2004 | Marks | |
| 2005/0059488 A1 | 3/2005 | Larsen et al. | |
| 2006/0033713 A1 * | 2/2006 | Pryor | 345/158 |
| 2006/0188144 A1 | 8/2006 | Sasaki et al. | |
| 2006/0239558 A1 | 10/2006 | Rafii et al. | |
| 2006/0252541 A1 * | 11/2006 | Zalewski et al. | 463/36 |
| 2007/0013718 A1 | 1/2007 | Ohba | |
| 2007/0060336 A1 | 3/2007 | Marks et al. | |
| 2007/0098222 A1 | 5/2007 | Porter et al. | |
| 2007/0110298 A1 * | 5/2007 | Graepel et al. | 382/154 |
| 2007/0216894 A1 | 9/2007 | Garcia et al. | |
| 2007/0260984 A1 | 11/2007 | Marks et al. | |
| 2007/0279485 A1 | 12/2007 | Ohba et al. | |
| 2007/0283296 A1 | 12/2007 | Nilsson | |
| 2007/0298882 A1 | 12/2007 | Marks et al. | |
| 2008/0001951 A1 | 1/2008 | Marks et al. | |
| 2008/0026838 A1 | 1/2008 | Dunstan et al. | |
| 2008/0036732 A1 | 2/2008 | Wilson et al. | |
| 2008/0059578 A1 * | 3/2008 | Albertson et al. | 709/204 |
| 2008/0062257 A1 | 3/2008 | Corson | |
| 2008/0085048 A1 | 4/2008 | Venetsky | |
| 2008/0089587 A1 | 4/2008 | Kim | |
| 2008/0100620 A1 | 5/2008 | Nagai et al. | |
| 2008/0126937 A1 | 5/2008 | Pachet | |
| 2008/0134102 A1 | 6/2008 | Movold et al. | |
| 2008/0152191 A1 | 6/2008 | Fujimura et al. | |
| 2008/0215972 A1 | 9/2008 | Zalewski et al. | |
| 2008/0215973 A1 | 9/2008 | Zalewski et al. | |
| 2008/0220867 A1 * | 9/2008 | Zalewski et al. | 463/37 |
| 2008/0225041 A1 * | 9/2008 | El Dokor et al. | 345/419 |
| 2009/0077504 A1 * | 3/2009 | Bell et al. | 715/863 |
| 2009/0141933 A1 | 6/2009 | Wagg | |
| 2009/0167679 A1 | 7/2009 | Klier | |
| 2009/0221368 A1 | 9/2009 | Yen et al. | |
| 2010/0201693 A1 * | 8/2010 | Caplette et al. | 345/474 |
| 2010/0302138 A1 * | 12/2010 | Poot et al. | 345/156 |
| 2012/0033856 A1 * | 2/2012 | Flagg et al. | 382/103 |
| 2012/0196660 A1 * | 8/2012 | El Dokor et al. | 463/8 |
| 2012/0257035 A1 * | 10/2012 | Larsen | 348/78 |

FOREIGN PATENT DOCUMENTS

| | | | |
|---|---|---|---|
| JP | 08044490 A1 | 2/1996 | |
| WO | 93/10708 A1 | 6/1993 | |
| WO | 97/17598 A1 | 5/1997 | |
| WO | WO 99/15863 A1 | 4/1999 | |
| WO | 99/44698 A1 | 9/1999 | |
| WO | WO 01/59975 A3 | 8/2001 | |
| WO | WO 02/82249 A2 | 10/2002 | |
| WO | WO 03/001722 A3 | 1/2003 | |
| WO | WO 03/046706 A1 | 6/2003 | |
| WO | WO 03/054683 A3 | 7/2003 | |
| WO | WO 03/071410 A3 | 8/2003 | |
| WO | WO 03/073359 A3 | 9/2003 | |
| WO | WO 2009/059065 A1 | 5/2009 | |

OTHER PUBLICATIONS

Zhao, "Dressed Human Modeling, Detection, and Parts Localization", Paper, doctoral dissertation, tech. report CMU-RI-TR-01-19, Robotics Institute, Carnegie Mellon University, Jul. 2001, 1-107.

Derpanis et al, "Hand Gesture Recognition within a Linguistics-Based Framework", Computer Vision ECCV 2004, 8th European Conference on Computer Vision, Prague, Czech Republic, May 11-14, 2004, Part I, 282-296.

TiltnTwist News, "TILTnTWIST Announces Four Windows Mobile Games Using Gesturetek Mobile's Motion Control Technology" New York, NY, Nov. 11, 2008, 3 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

(56) References Cited

OTHER PUBLICATIONS

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

\* cited by examiner

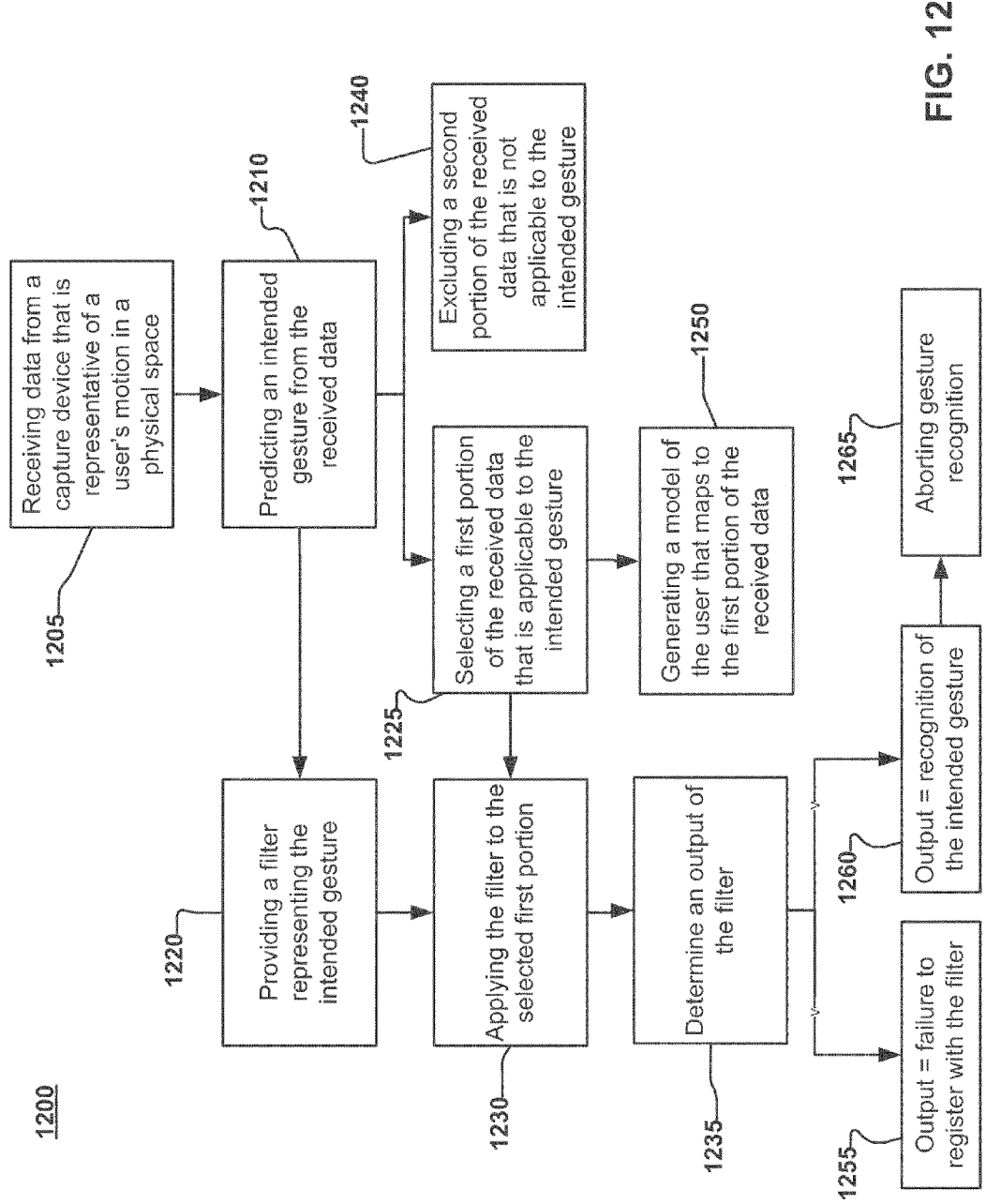

ISOLATE EXTRANEOUS MOTIONS

CROSS-REFERENCE

The present application claims priority to U.S. Provisional Application No. 61/174,881, titled "Isolate Extraneous Motions" filed May 1, 2009, the contents of which are incorporated herein in its entirety.

BACKGROUND

Many computing applications such as computer games, multimedia applications, office applications or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

A system may receive image data and capture motion with respect to a target in a physical space and interpret the received data for visually representing the target and/or recognizing gestures from the captured motion. Gestures recognized from the motion may control certain aspects of an operating system or executing application. For example, a user's motion may be tracked and the visual representation may be an avatar displayed on a monitor. A user may perform gestures in the physical space, where the gestures are translated to a control in a gesture-based system and/or in the virtual space, such as to open a file or to execute a punch in a punching game.

It may be desirable to isolate aspects of captured motion to differentiate random and extraneous motions. For example, a gesture may comprise motion of a user's right arm, and it may be desirable to isolate the motion of the user's right arm and exclude an interpretation of other motion, such as motion of the user's left arm. Thus, the isolated aspect may be the focus of the received data representative of the captured motion.

The isolated aspect may be a motion that is common to many users, such as the exclusion of the user's left arm motion from a gesture focused on the right arm, as described above. Alternately, the isolated aspect may be a motion specific to a user, such as a user's tendency to lean or slouch. The isolated aspect may be an aspect of the captured motion that is identified so as to remove the consideration of the isolated aspect from the analysis for gesture recognition. For example, gesture filters may be modified to correspond to the user's natural lean to eliminate the effect the lean has on the registry of a motion with a gesture filter. Thus, by modifying the gesture filters to correspond to the user's natural lean, the lean may not register a gesture that would otherwise correspond to a gesture filter for that gesture. When mapping captured motion to a visual representation, the isolated aspect may be excluded, where a canned animation may be inserted for the isolated aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for a gesture recognizer system architecture in accordance with this specification are further described with reference to the accompanying drawings in which:

FIG. 12 depicts a flow diagram for a method of applying applying a filter to a selected portion of data received by a capture device system.

DETAILED DESCRIPTION OF ILLUSTRATIVE EMBODIMENTS

Figure 1A:
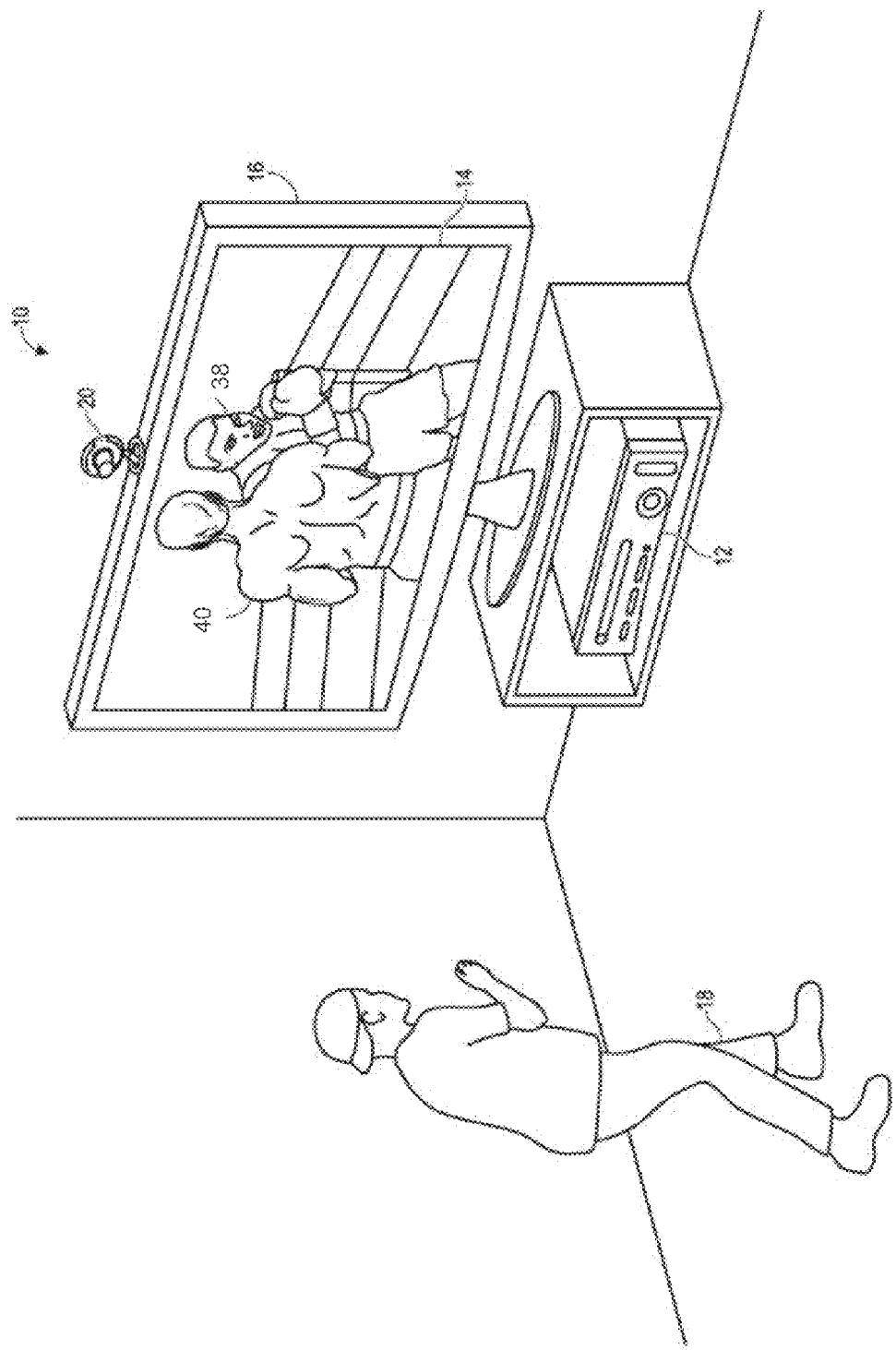
FIGS. 1A and 1B illustrate an example embodiment of a target recognition, analysis, and tracking system with a user playing a game.

It may be desirable to isolate aspects of captured motion to differentiate random and extraneous motions. The isolated aspects may be removed from the visual representation that map to the motion of a user. A user may perform gestures in the physical space, where the gestures are translated to a control in a gesture-based system and/or in the virtual space, such as to open a file or to execute a punch in a punching game. The isolated aspects may be removed prior to a comparison of the captured motion to gesture filters for gesture recognition. The system may identify gestures by employing, for example, a gesture recognition engine, that compares the captured motion against gesture filters. A gesture recognizer engine, the architecture of which is described more fully below, may be used to determine when a particular gesture has been made by a target, such as a user.

To generate a model representative of a target or object in a physical space, a capture device can capture a depth image of the scene and scan targets or objects in the scene. The image data may include data representative of any motion in the physical space that is captured by the capture device, such as a camera. The captured motion could include the motion of a target, such as a human or an object, in the physical space. The image data may include data representative of a gesture that translates to a control in an operating system or application. The motion or the gesture may be dynamic, such as a running motion, or the motion may be static, such as a user that is posed with little movement.

In one embodiment, the capture device may determine whether one or more targets or objects in the scene corresponds to a human target such as the user. To determine whether a target or object in the scene corresponds a human target, each of the targets may be flood filled and compared to a pattern of a human body model. Each target or object that matches the human body model may then be scanned to generate a model associated therewith. For example, a target identified as a human may be scanned to generate a skeletal model associated therewith. The skeletal model may be provided to the computing environment for tracking the skeletal model and rendering an avatar associated with the skeletal model. The computing environment may determine which controls to perform in an application executing on the computer environment based on, for example, gestures of the user that have been recognized and mapped to the skeletal model. Thus, user feedback may be displayed, such as via an avatar on a screen, and the user can control that avatar's motion by making gestures in the physical space.

As will be described herein, it may be desirable to isolate aspects of the image data that represents motion in the physical space, and modify gesture filter data based on the isolated aspect. For example, it may be desirable to isolate aspects of captured motion to eliminate or reduce the effects of the aspect on gesture recognition. Alternately, the isolated aspect may be the only aspect of the captured motion that is evaluated for gesture recognition.

The system, methods, and components described herein may be embodied in a multi-media console, such as a gaming console, or in any other computing device in which it is desired to modify image data, including, by way of example and without any intended limitation, satellite receivers, set top boxes, arcade games, personal computers (PCs), portable telephones, personal digital assistants (PDAs), and other hand-held devices.

Figure 1B:
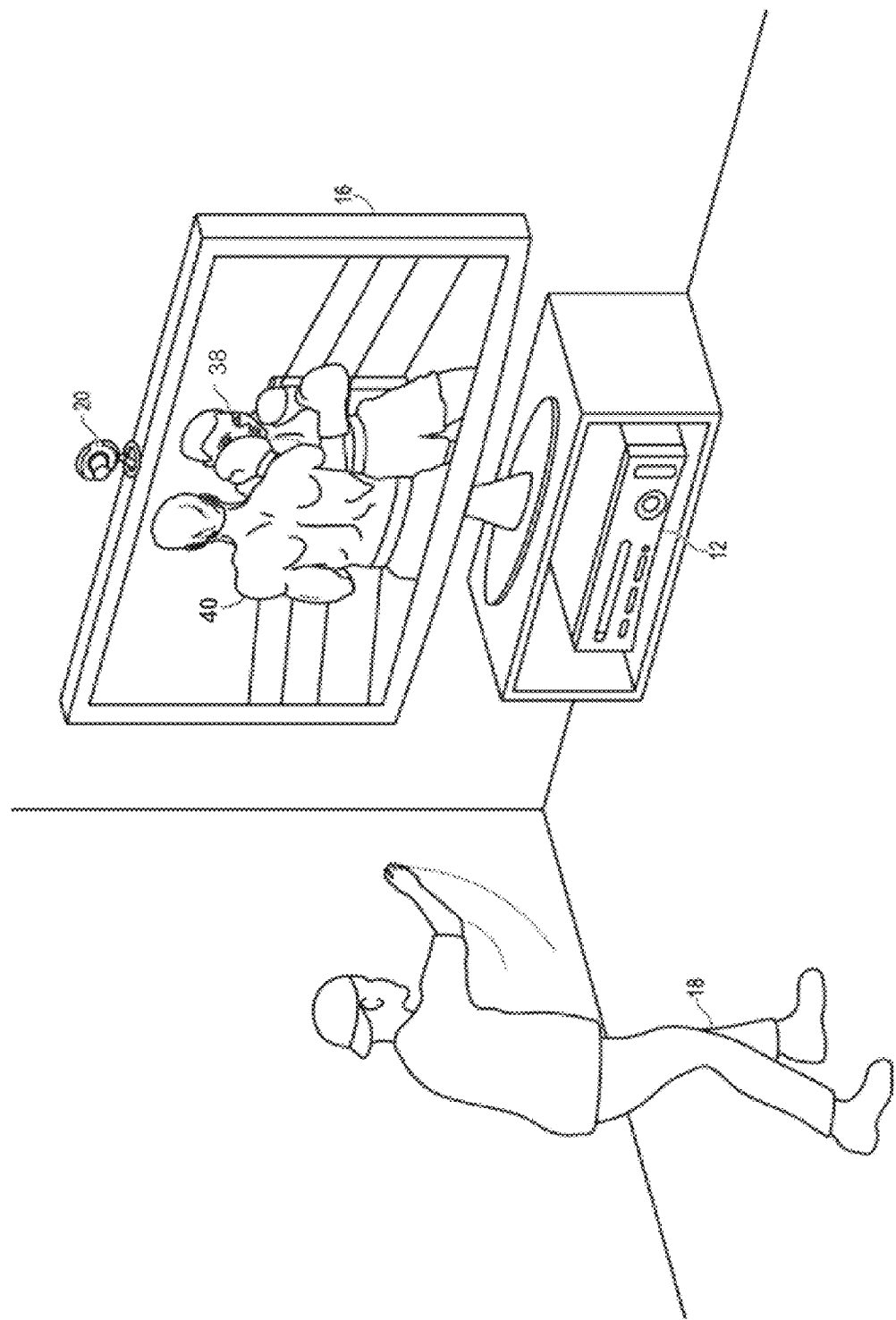

FIGS. 1A and 1B illustrate an example embodiment of a configuration of a target recognition, analysis, and tracking system 10 that may employ techniques for modifying aspects of image data that may, in turn, modify the visual representation that corresponds to the image data. In the example embodiment, a user 18 playing a boxing game. In an example embodiment, the system 10 may recognize, analyze, and/or track a human target such as the user 18. The system 10 may gather information related to the user's gestures in the physical space.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computer environment 12. Thus, according to one embodiment, the user 18 may move his or her body to control the application.

The system 10 may translate an input to a capture device 20 into an animation, the input being representative of a user's motion, such that the animation is driven by that input. Thus, the user's motions may map to an avatar such that the user's motions in the physical space are performed by the avatar. The user's motions may be gestures that are applicable to a control in an application. As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 38 to the user 18. The computing environment 12 may also use the audiovisual device 16 to provide a visual representation of a player avatar 24 that the user 18 may control with his or her movements. For example, as shown in FIG. 1B, the user 18 may throw a punch in physical space to cause the player avatar 40 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 40 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 40. For example, the player may use movements to end, pause, or save a game, select a level, view high scores, communicate with a friend, etc. Additionally, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

A user's gestures or motion may be interpreted as a control that may correspond to actions other than controlling the player avatar 40. For example, the player may use movements to end, pause, or save a game, select a level, view high scores, communicate with a friend, etc. According to other example embodiments, the target recognition, analysis, and tracking system 10 may interpret target movements for controlling aspects of an operating system and/or application that are outside the realm of games. For example, virtually any controllable aspect of an operating system and/or application may be controlled by movements of the target such as the user 18.

The user's gesture may be controls applicable to an operating system, non-gaming aspects of a game, or a non-gaming application. The user's gestures may be interpreted as object manipulation, such as controlling a user interface. For example, consider a user interface having blades or a tabbed interface lined up vertically left to right, where the selection of each blade or tab opens up the options for various controls within the application or the system. The system may identify the user's hand gesture for movement of a tab, where the user's hand in the physical space is virtually aligned with a tab in the application space. The gesture, including a pause, a grabbing motion, and then a sweep of the hand to the left, may be interpreted as the selection of a tab, and then moving it out of the way to open the next tab.

Figure 2:
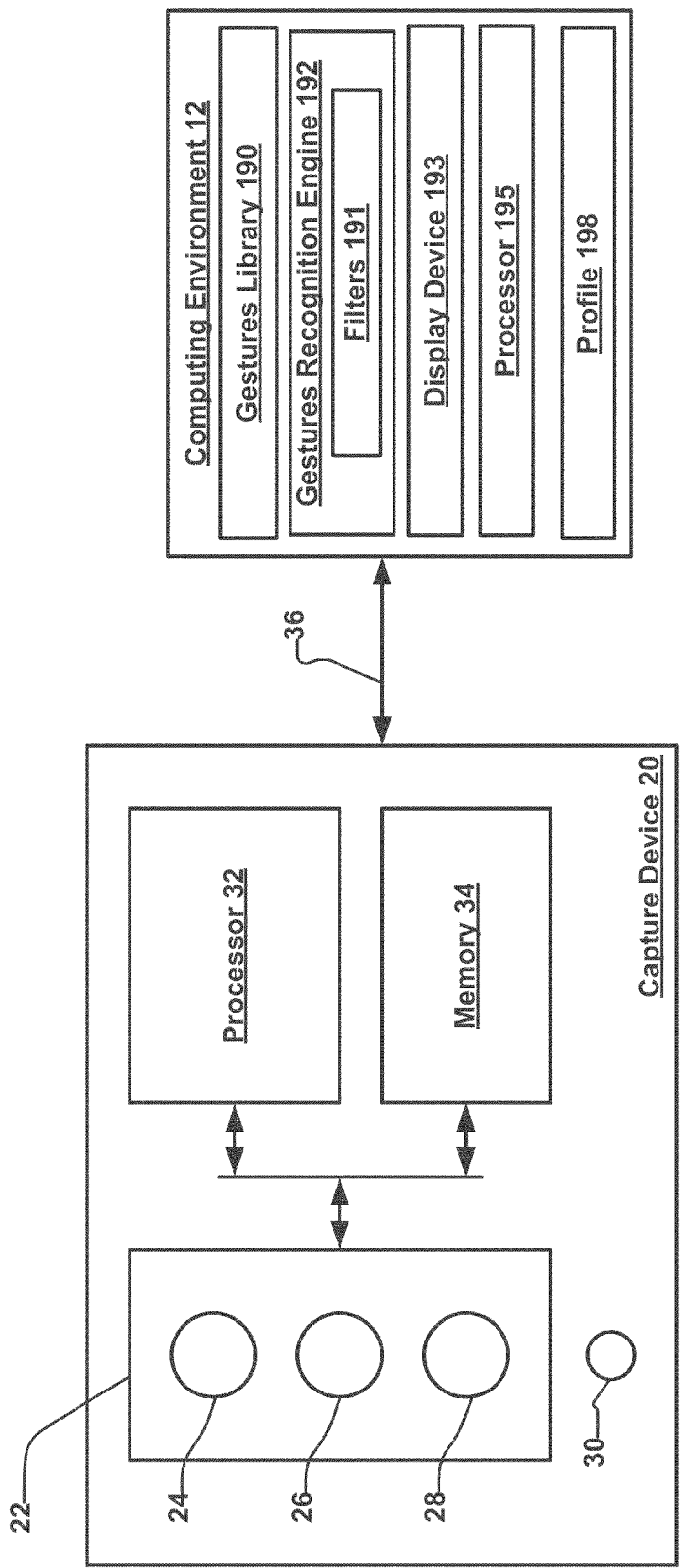
FIG. 2 illustrates an example embodiment of a capture device that may be used in a target recognition, analysis, and tracking system and incorporate chaining and animation blending techniques.

FIG. 2 illustrates an example embodiment of a capture device 20 that may be used for target recognition, analysis, and tracking, where the target can be a user or an object. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30, or an array of microphones. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, control an application such as a game or word processor.

As shown, in FIG. 2, the computing environment 12 may include a gestures library 190 and a gestures recognition engine 192. The gestures recognition engine 192 may include a collection of gesture filters 191. A filter may comprise code and associated data that can recognize gestures or otherwise process depth, RGB, or skeletal data. Each filter 191 may comprise information defining a gesture along with parameters, or metadata, for that gesture. For instance, a throw, which comprises motion of one of the hands from behind the rear of the body to past the front of the body, may be implemented as a gesture filter comprising information representing the movement of one of the hands of the user from behind the rear of the body to past the front of the body, as that movement would be captured by a depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

While it is contemplated that the gestures recognition engine may include a collection of gesture filters, where a filter may comprise code or otherwise represent a component for processing depth, RGB, or skeletal data, the use of a filter is not intended to limit the analysis to a filter. The filter is a representation of an example component or section of code that analyzes data of a scene received by a system, and comparing that data to base information that represents a gesture. As a result of the analysis, the system may produce an output corresponding to whether the input data corresponds to the gesture. The base information representing the gesture may be adjusted to correspond to the recurring feature in the history of data representative of the user's capture motion. The base information, for example, may be part of a gesture filter as described above. But, any suitable manner for analyzing the input data and gesture data is contemplated.

Gestures may be grouped together into genre packages of complimentary gestures that are likely to be used by an application in that genre. Complimentary gestures—either complimentary as in those that are commonly used together, or complimentary as in a change in a parameter of one will change a parameter of another—may be grouped together into genre packages. These packages may be provided to an application, which may select at least one. The application may tune, or modify, the parameter of a gesture or gesture filter to best fit the unique aspects of the application. When that parameter is tuned, a second, complimentary parameter (in the inter-dependent sense) of either the gesture or a second gesture is also tuned such that the parameters remain complimentary. Genre packages for video games may include genres such as first-user shooter, action, driving, and sports.

The data captured by the cameras 26, 28 and device 20 in the form of the skeletal model and movements associated with it may be compared to the gesture filters 191 in the gesture library 190 to identify when a user (as represented by the skeletal model) has performed one or more gestures. Thus, inputs to a filter such as filter 191 may comprise things such as joint data about a user's joint position, like angles formed by the bones that meet at the joint, RGB color data from the scene, and the rate of change of an aspect of the user. As mentioned, parameters may be set for the gesture. Outputs from a filter 191 may comprise things such as the confidence that a given gesture is being made, the speed at which a gesture motion is made, and a time at which the gesture occurs.

The computing environment 12 may include a processor 196 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints is identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 20 itself, and the raw image data of depth and color (where the capture device comprises a 3D camera) values are transmitted to the computing environment 12 via link 36. In another embodiment, the processing is performed by a processor 32 coupled to the camera 20 and then the parsed image data is sent to the computing environment 12. In still another embodiment, both the raw image data and the parsed image data are sent to the computing environment 12. The computing environment 12 may receive the parsed image data but it may still receive the raw data for executing the current process or application. For instance, if an image of the scene is transmitted across a computer network to another user, the computing environment 12 may transmit the raw data for processing by another computing environment.

The computing environment 12 may use the gestures library 190 to interpret movements of the skeletal model and to control an application based on the movements. The computing environment 12 can model and display a representation of a user, such as in the form of an avatar or a pointer on a display, such as in a display device 193. Display device 193 may include a computer monitor, a television screen, or any suitable display device. For example, a camera-controlled computer system may capture user image data and display user feedback on a television screen that maps to the user's gestures. The user feedback may be displayed as an avatar on the screen such as shown in FIGS. 1A and 1B. The avatar's motion can be controlled directly by mapping the avatar's movement to those of the user's movements. The user's gestures may control certain aspects of the application.

According to an example embodiment, the target may be a human target in any position such as standing or sitting, a human target with an object, two or more human targets, one or more appendages of one or more human targets or the like that may be scanned, tracked, modeled and/or evaluated to generate a virtual screen, compare the user to one or more stored profiles and/or to store profile information 198 about the target in a computing environment such as computing environment 12. The profile information 198 may be in the form of user profiles, personal profiles, application profiles, system profiles, or any other suitable profile for storing data for later access. The profile information 198 may be accessible via an application or be available system-wide, for example. The profile information 198 may include lookup tables for loading specific user profile information.

According to example embodiments, lookup tables may include user specific profile information. In one embodiment, the computing environment such as computing environment 12 may include stored profile data 198 about one or more users in lookup tables. The stored profile data 198 may include, among other things the targets scanned or estimated body size, skeletal models, body models, voice samples or passwords, the targets age, previous gestures, target limitations and standard usage by the target of the system, such as, for example a tendency to sit, left or right handedness, or a tendency to stand very near the capture device. This information may be used to determine if there is a match between a target in a capture scene and one or more user profiles 198, that, in one embodiment, may allow the system to adapt the virtual screen to the user, or to adapt other elements of the computing or gaming experience according to the profile 198.

One or more personal profiles 198 may be stored in computer environment 12 and used in a number of user sessions, or one or more personal profiles may be created for a single session only. Users may have the option of establishing a profile where they may provide information to the system such as a voice or body scan, age, personal preferences, right or left handedness, an avatar, a name or the like. Personal profiles may also be provided for "guests" who do not provide any information to the system beyond stepping into the capture space. A temporary personal profile may be established for one or more guests. At the end of a guest session, the guest personal profile may be stored or deleted.

The gestures library 190, gestures recognition engine 192, and profile 198 may be implemented in hardware, software or a combination of both. For example, the gestures library 190 and gestures recognition engine 192 may be implemented as software that executes on a processor, such as processor 196, of the computing environment (or on processing unit 101 of FIG. 3 or processing unit 259 of FIG. 4).

Figure 3:
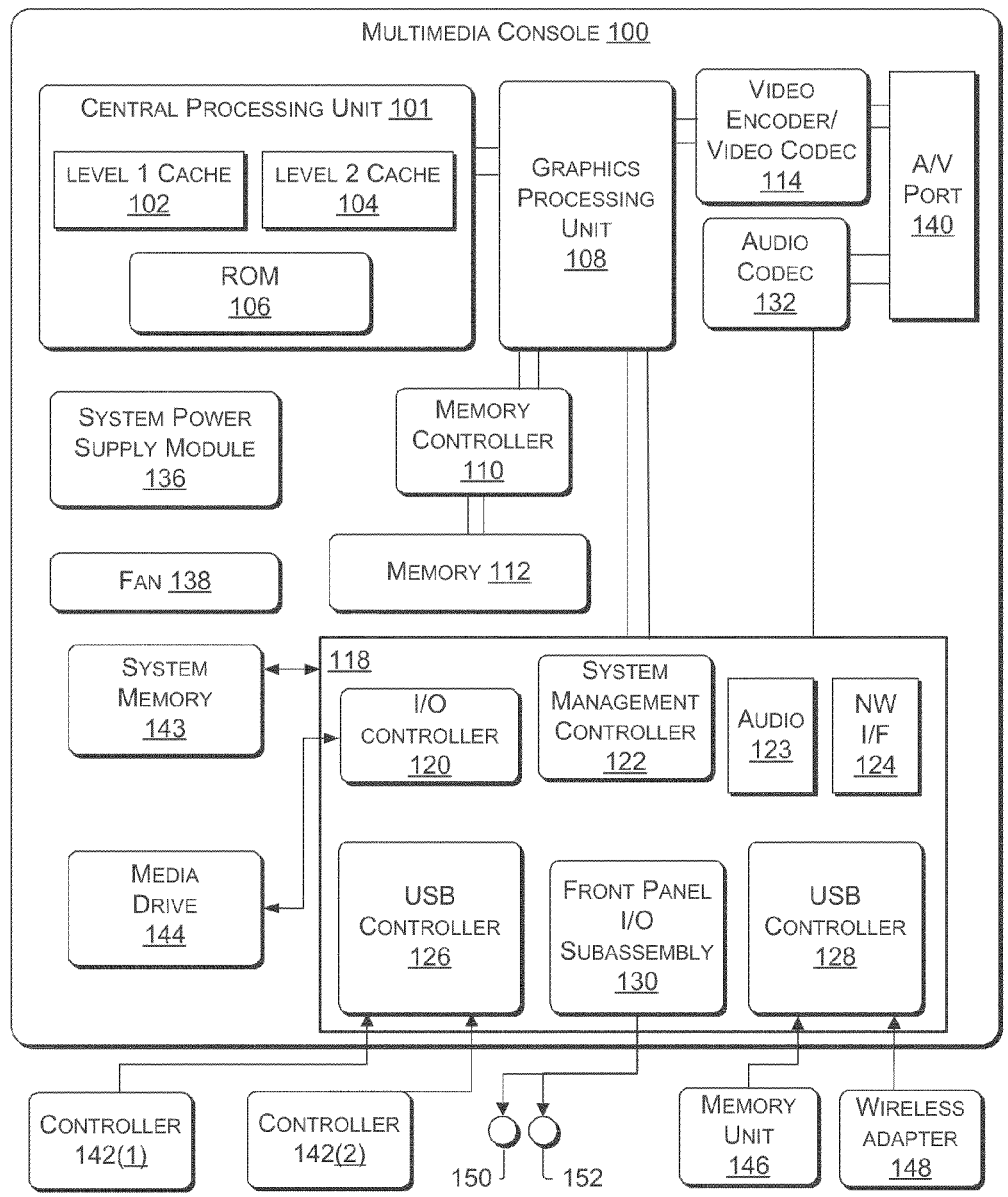
FIG. 3 illustrates an example embodiment of a computing environment in which the animation techniques described herein may be embodied.
Figure 4:
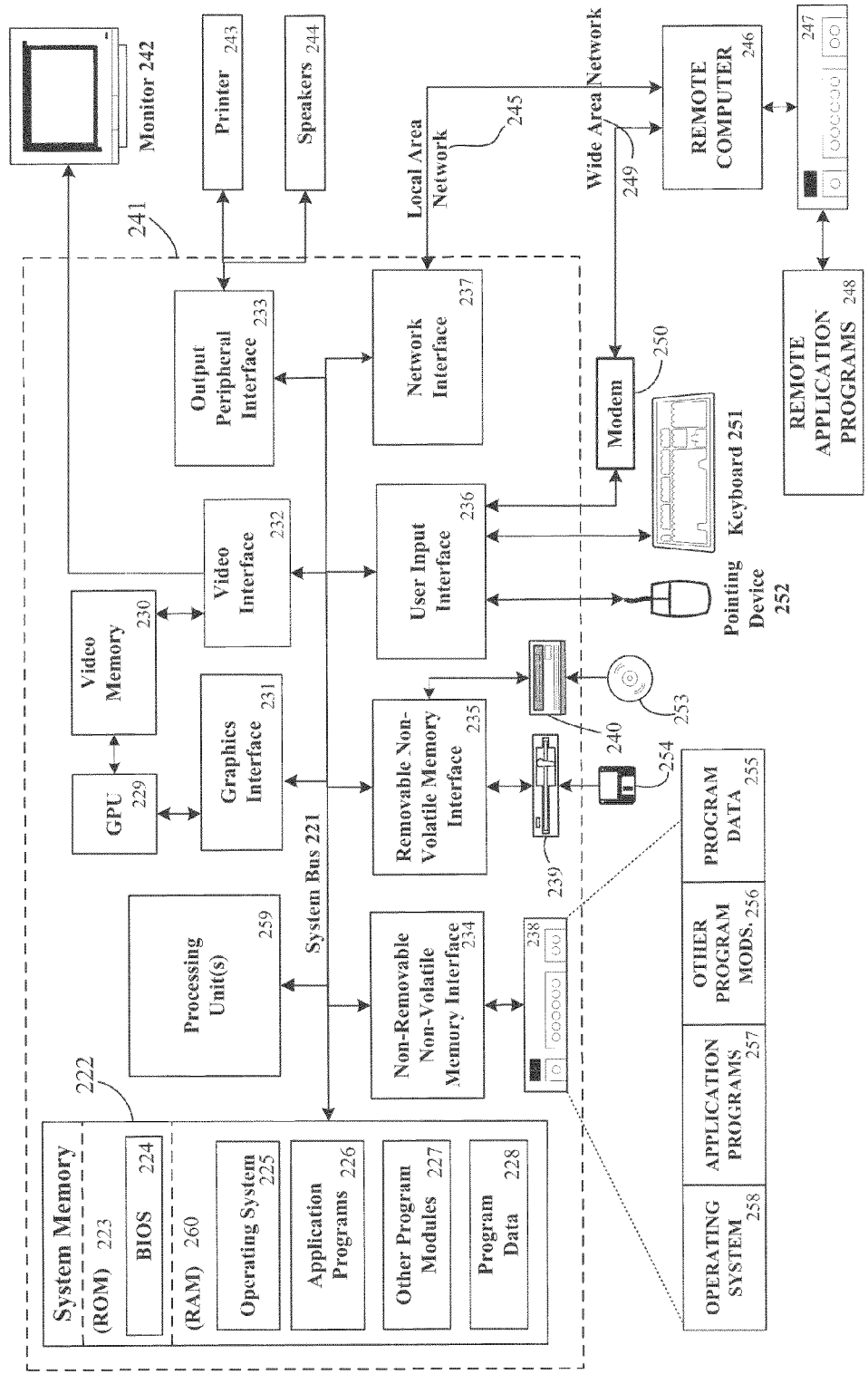
FIG. 4 illustrates another example embodiment of a computing environment in which the animation techniques described herein may be embodied.

It is emphasized that the block diagrams depicted in FIGS. 2-4 are exemplary and not intended to imply a specific implementation. Thus, the processor 195 or 32 in FIG. 1, the processing unit 101 of FIG. 3, and the processing unit 259 of FIG. 4, can be implemented as a single processor or multiple processors. Multiple processors can be distributed or centrally located. For example, the gestures library 190 may be implemented as software that executes on the processor 32 of the capture device or it may be implemented as software that executes on the processor 195 in the computing environment. Any combination of processors that are suitable for performing the techniques disclosed herein are contemplated. Multiple processors can communicate wirelessly, via hard wire, or a combination thereof.

Furthermore, as used herein, a computing environment may refer to a single computing device or to a computing system. The computing environment may include both computing and non-computing components. The computing environment may include a display device, such as display device 193 shown in FIG. 2. A display device may be an entity separate but coupled to the computing environment or the display device may be the computing device that processes and displays, for example. As used herein, references to a computing system, computing device, computing environment, computer, processor, or other computing component may be used interchangeably.

FIG. 3 illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 1 18. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs.), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

FIG. 4 illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5A:
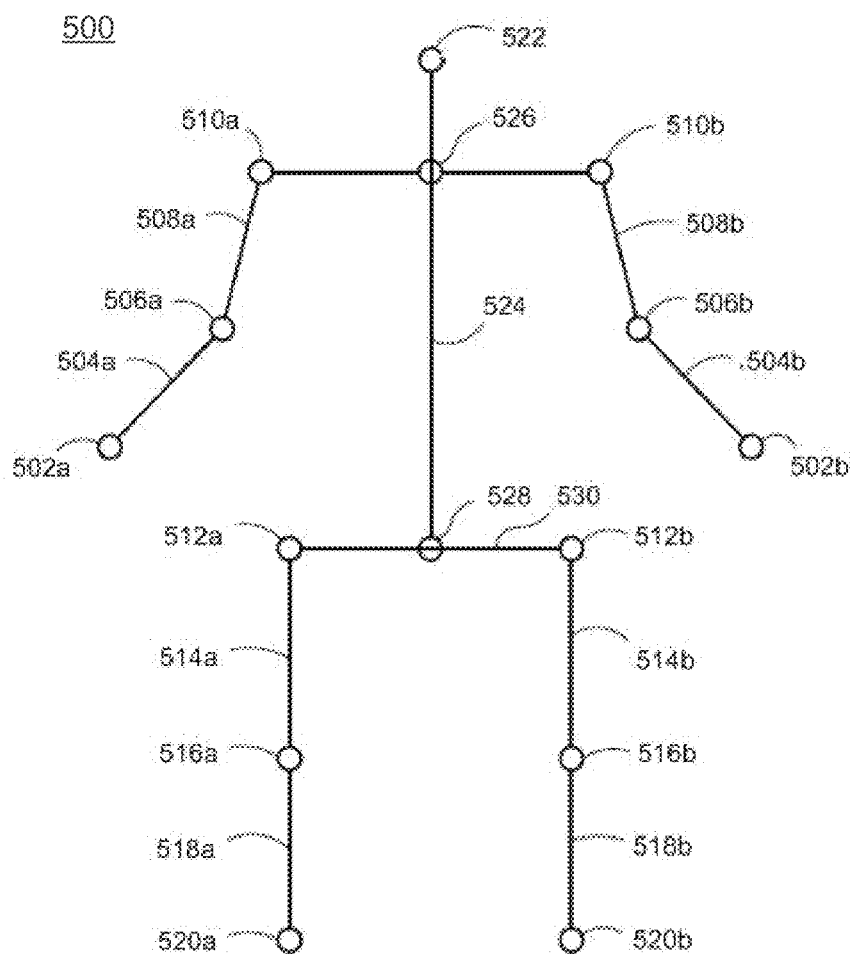
FIG. 5A illustrates a skeletal mapping of a user that has been generated from a depth image.

FIG. 5A depicts an example skeletal mapping of a user that may be generated from image data captured by the capture device 20. In this embodiment, a variety of joints and bones are identified: each hand 502, each forearm 504, each elbow 506, each bicep 508, each shoulder 510, each hip 512, each thigh 514, each knee 516, each foreleg 518, each foot 520, the head 522, the torso 524, the top 526 and bottom 528 of the spine, and the waist 530. Where more points are tracked, additional features may be identified, such as the bones and joints of the fingers or toes, or individual features of the face, such as the nose and eyes.

In an example embodiment, the human target may be isolated and a bitmask of the human target may be created to scan for one or more body parts. The bitmask may be created by, for example, flood filling the human target such that the human target may be separated from other targets or objects in the scene elements. The bitmask may then be analyzed for one or more body parts to generate a model such as a skeletal model, a mesh human model, or the like of the human target. A bitmask may then be generated with respect to FIGS. 6-9 as a three-dimensional model. For example, the bitmask generated for the human target may include values of the human target along, for example, an X, Y, and Z axis. For example, the skeletal model may have at least one joint, and that joint may correspond to an X, Y, and Z position. Each body part may be characterized as a mathematical vector defining joints and bones of the skeletal model, such as the model 500 from FIG. 5A.

A joint may be adjusted to modify the skeletal model 500 of the human target that corresponds to a desired visual representation of the skeletal mode. According to an example embodiment, the initial scan of the bitmask may render a joint 510b that represents the left shoulder joint. The joint 510b may not accurately represent a typical location of a left shoulder joint of a human or it may not accurately represent a location of the left shoulder joint that will provide a balanced or otherwise desired visual representation of the user. The joint 510b may then be adjusted such that the joint may be repositioned with respect to a 3-dimensional coordinate system, for example, along the X, Y, and Z axes, such that the model more accurately represent the desired location of a left shoulder joint of a human.

According to an example embodiment, upon determining the values of, for example, a body part, a data structure may be created that may include measurement values such as length, width, or the like of the body part associated with the scan of the bitmask of the human target. The data structure may include any modifications to joints or body parts as a result of applying corrective data to the model. According to an example embodiment, the skeletal model 500 may include one or more data structures that may represent, for example, a human target.

As shown in FIG. 5A, the skeletal model 500 may include one or more joints 502-530. According to an example embodiment, each of the joints 502-530 may enable one or more body parts defined there between to move relative to one or more other body parts. For example, a model representing a human target may include a plurality of rigid and/or deformable body parts that may be defined by one or more structural members such as "bones" with the joints 502-530 located at the intersection of adjacent bones. The joints 502-530 may enable various body parts associated with the bones and joints 502-530 to move independently of each other. For example, the bone defined between the joints 502 and 506, shown in FIG. 5A, corresponds to a forearm that may be moved independent of, for example, the bone defined between joints 516 and 518 that corresponds to a calf.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 504 in front of his torso 524. A gesture may also incorporate props, such as by swinging a mock sword. A gesture may comprise more than one body part, such as clapping the hands 502 together, or a subtler motion, such as pursing one's lips.

A user's gestures may be used for input in a general computing context. For instance, various motions of the hands 502 or other body parts may correspond to common system wide tasks such as navigate up or down in a hierarchical list, open a file, close a file, and save a file. For instance, a user may hold his hand with the fingers pointing up and the palm facing the capture device 20. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands 502 and feet 520 may correspond to steering a vehicle in a direction, shifting gears, accelerating, and braking. Thus, a gesture may indicate a wide variety of motions that map to a displayed user representation, and in a wide variety of applications, such as video games, text editors, word processing, data management, etc.

A user may generate a gesture that corresponds to walking or running, by walking or running in place himself. For example, the user may alternately lift and drop each leg 512-520 to mimic walking without moving. The system may parse this gesture by analyzing each hip 512 and each thigh 514. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters. Information related to the gesture may be stored for purposes of pre-canned animation.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 520 leave the ground entirely. The system may parse the skeleton for this gesture by analyzing the angle relation of the shoulders 510, hips 512 and knees 516 to see if they are in a position of alignment equal to standing up straight. Then these points and upper 526 and lower 528 spine points may be monitored for any upward acceleration. A sufficient combination of acceleration may trigger a jump gesture. A sufficient combination of acceleration with a particular gesture may satisfy the parameters of a transition point.

Given this "heel lift jump" gesture, an application may set values for parameters associated with this gesture. The parameters may include the above acceleration threshold, which determines how fast some combination of the user's shoulders 510, hips 512 and knees 516 must move upward to trigger the gesture, as well as a maximum angle of alignment between the shoulders 510, hips 512 and knees 516 at which a jump may still be triggered. The outputs may comprise a confidence level, as well as the user's body angle at the time of the jump.

Setting parameters for a gesture based on the particulars of the application that will receive the gesture is important in accurately identifying gestures. Properly identifying gestures and the intent of a user greatly helps in creating a positive user experience.

An application may set values for parameters associated with various transition points to identify the points at which to use pre-canned animations. Transition points may be defined by various parameters, such as the identification of a particular gesture, a velocity, an angle of a target or object, or any combination thereof. If a transition point is defined at least in part by the identification of a particular gesture, then properly identifying gestures assists to increase the confidence level that the parameters of a transition point have been met.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 502-510 to full length while making the grab gesture. In this situation, a similar grab gesture where the user only partially extends his arm 502-510 may not achieve the result of interacting with the ball. As described below, corrective data may be applied to the image data representative of the gesture to smooth the virtual animation of the user's arm towards the ball. Thus, even though the user's arm is a full length away or not close enough for interaction with the ball, the corrective data may alter the image data to align the visual representation of the user with the virtual ball.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 510*a*, and on the same side of the head 522 as the throwing arm 502*a*-310*a*. It may not be necessary to define all bounds of a volume, such as with this throwing gesture, where an outer bound away from the body is left undefined, and the volume extends out indefinitely, or to the edge of scene that is being monitored.

Figure 5B:
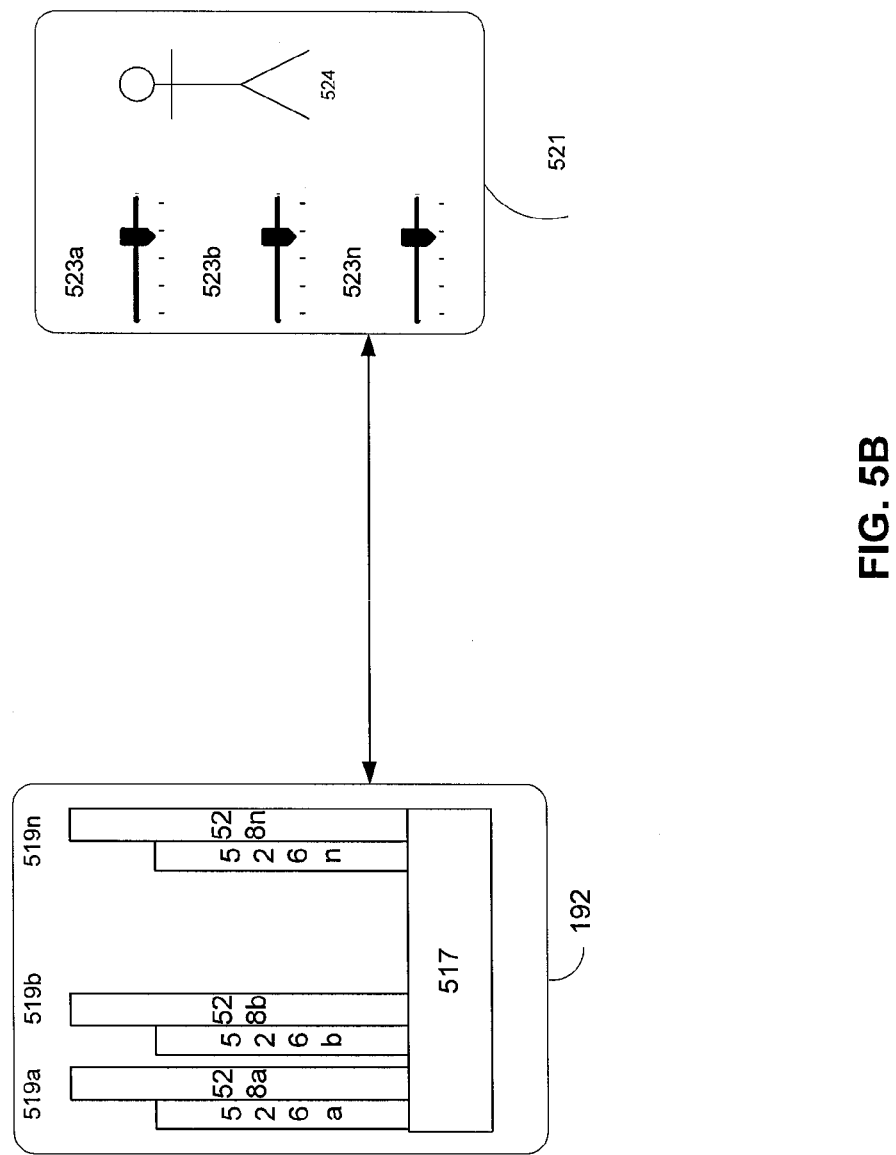
FIG. 5B illustrates further details of the gesture recognizer architecture shown in FIG. 2.

FIG. 5B provides further details of one exemplary embodiment of the gesture recognizer engine 192 of FIG. 2. As shown, the gesture recognizer engine 192 may comprise at least one filter 519 to determine a gesture or gestures. A filter 519 comprises information defining a gesture 526 (hereinafter referred to as a "gesture"), and may comprise at least one parameter 528, or metadata, for that gesture. For instance, a throw, which comprises motion of one of the hands from behind the rear of the body to past the front of the body, may be implemented as a gesture 526 comprising information representing the movement of one of the hands of the user from behind the rear of the body to past the front of the body, as that movement would be captured by the depth camera. Parameters 528 may then be set for that gesture 526. Where the gesture 526 is a throw, a parameter 528 may be a threshold velocity that the hand has to reach, a distance the hand must travel (either absolute, or relative to the size of the user as a whole), and a confidence rating by the recognizer engine that the gesture occurred. These parameters 528 for the gesture 526 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

The gestures library and filter parameters may be tuned for an application or a context of an application by a gesture tool. A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-person shooter game that involves operating a motor vehicle. While the user is on foot, making a fist with the fingers towards the ground and extending the fist in front and away from the body may represent a punching gesture. While the user is in the driving context, that same motion may represent a "gear shifting" gesture. There may also be one or more menu environments, where the user can save his game, select among his character's equipment or perform similar actions that do not comprise direct game-play. In that environment, this same gesture may have a third meaning, such as to select something or to advance to another screen.

The gesture recognizer engine 192 may have a base recognizer engine 517 that provides functionality to a gesture filter 519. In an embodiment, the functionality that the recognizer engine 517 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 519 are loaded and implemented on top of the base recognizer engine 517 and can utilize services provided by the engine 517 to all filters 519. In an embodiment, the base recognizer engine 517 processes received data to determine whether it meets the requirements of any filter 519. Since these provided services, such as parsing the input, are provided once by the base recognizer engine 517 rather than by each filter 519, such a service need only be processed once in a period of time as opposed to once per filter 519 for that period, so the processing required to determine gestures is reduced.

An application may use the filters 519 provided by the recognizer engine 192, or it may provide its own filter 519, which plugs in to the base recognizer engine 517. In an embodiment, all filters 519 have a common interface to enable this plug-in characteristic. Further, all filters 519 may utilize parameters 528, so a single gesture tool as described below may be used to debug and tune the entire filter system 519.

These parameters 528 may be tuned for an application or a context of an application by a gesture tool 521. In an embodiment, the gesture tool 521 comprises a plurality of sliders 523, each slider 523 corresponding to a parameter 528, as well as a pictorial representation of a body 524. As a parameter 528 is adjusted with a corresponding slider 523, the body 524 may demonstrate both actions that would be recognized as the gesture with those parameters 528 and actions that would not be recognized as the gesture with those parameters 528, identified as such. This visualization of the parameters 528 of gestures provides an effective means to both debug and fine tune a gesture.

Figure 6A:
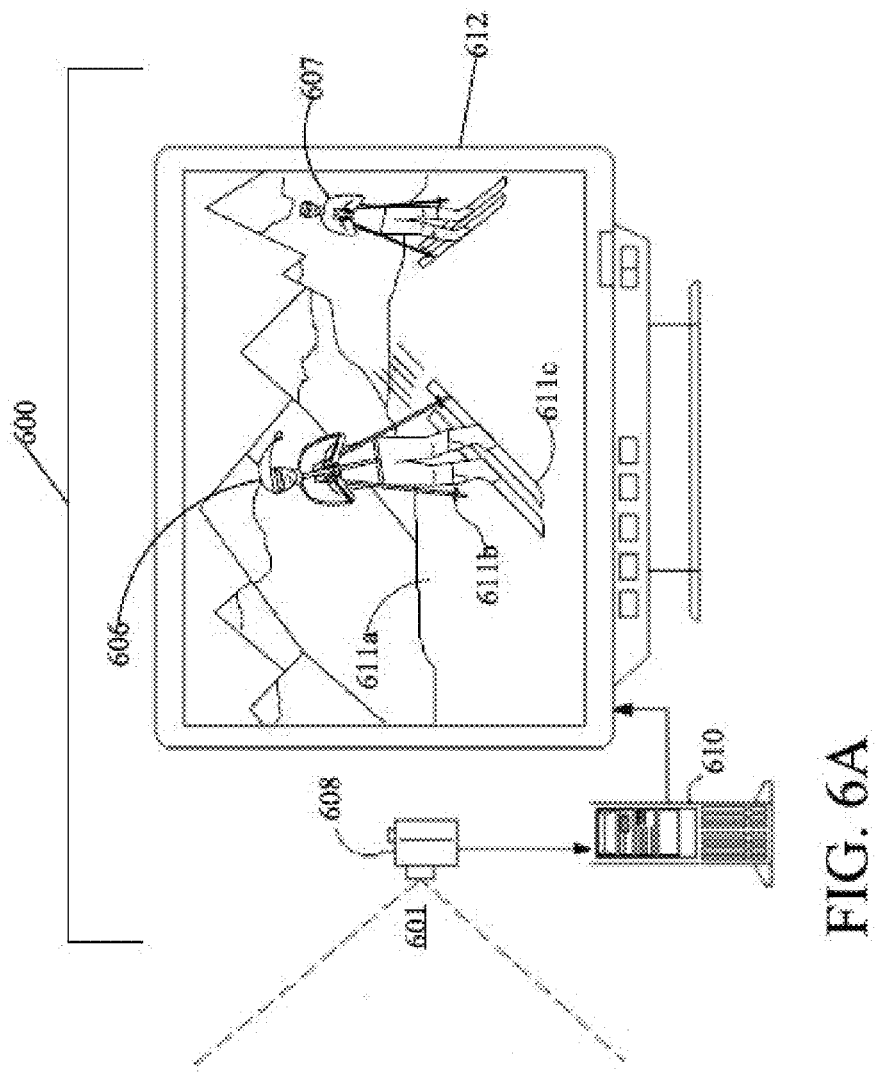
FIG. 6A illustrates an example embodiment of a computer-controlled capture device system that provides a visual representation of the user on a display.
Figure 6A:
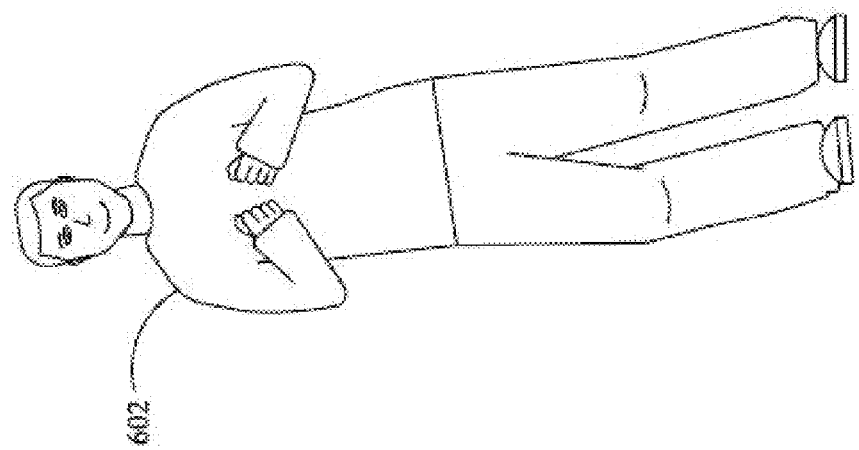

FIG. 6A illustrates an example of a system 600 that captures a target in a physical space 601 and maps it to a visual representation in a virtual environment. The target may be any object or user in the physical space 601. As shown in FIG. 6A, system 600 may comprise a capture device 608, a computing device 610, and a display device 612. For example, the capture device 608, computing device 610, and display device 612 may comprise any of the devices described with respect to FIGS. 1A-5B. It is contemplated that a single device may perform all of the functions in system 600, or any combination of suitable devices may perform the desired functions. For example, the computing device 610 may provide the functionality described with respect to the computing environment 12 shown in FIG. 2. The computing device 610 may also comprise its own camera component or may be coupled to a device having a camera component, such as capture device 608.

FIG. 6A represents the user's 602 motion at a discrete point in time and the display 612 displays a corresponding display of a visual representation 606 of the user 602 at that point of time. The system 600 may identify a gesture from the user's motion by evaluating the user's position in a single frame of capture data or over a series of frames. The rate that frames of image data are captured and displayed determines the level of continuity of the displayed motion of the visual representation. Though additional frames of image data may be captured and displayed, the frame depicted in FIG. 6A is selected for exemplary purposes.

In this example, the user 602 is playing a skiing game, where the ski mountain 611a shown on display 612 is virtual. The user can align himself or herself in the physical space 601 to correspond to the desired avatar 606 location on the virtual ski mountain 611a. In this example, a capture device 608 captures a scene in a physical space 601 in which a user 602 is present. The user 602 in the physical space is the target captured by the capture device 608 that processes data representative of the user's motion and/or provides the data to a computer, such as computing device 610. The captured information is interpreted for display of a visual representation of the user, such as avatar 606. For example, the capture device 608 or, as shown, a computing device 610 to which it is coupled, may output to a monitor 612.

A virtual space may comprise a representation of a three-dimensional space that a user may affect—say by moving an object—through user input. That virtual space may be a completely virtual space that has no correlation to a physical space of the user—such as a representation of a castle or a classroom not found in physical reality. That virtual space may also be based on a physical space that the user has no relation to, such as a physical classroom in Des Moines, Iowa that the user has never seen or been inside. For purposes of this example, the user 602 is playing a skiing game. The avatar 606 that maps to the user's 602 motions is the portion of the display that is controlled by the user's 602 motions in the physical space. The background (e.g., ski mountain 611a, ski poles 611b, skis 611c) are animations that are packaged with the skiing game application and do not correlate to the physical space 601. Thus, the only aspect of the display that is controlled by motion in the physical space 601, in this example, is the avatar 606 that maps to the user's 602 motions.

The virtual space may comprise a representation of some part of the user's physical space. A depth camera that is capturing the user may also capture the environment that the user is physically in, parse it to determine the boundaries of the space visible by the camera as well as discrete objects in that space, and create virtual representations of all or part of that, which are then presented to the user as a virtual space. For example, the capture device 608 may capture and scan a physical object and display a virtual object that maps directly to the image data of the physical object scanned by the capture device. For example, the ski poles 611b shown on the screen 612 may be a virtual representation of physical ski poles that the user is actually holding in the physical space. When the user moves the physical poles, the capture device may capture this, and display a corresponding movement of the virtual poles 611b. Thus, it is contemplated that other aspects of the display may represent objects or other users in the physical space. In another example, a second user in the physical space could map to a second skier in the virtual space. The second user could also gesture in the physical space to control aspects of the application.

Where two users are interacting with each other in the virtual environment, captured by a capture device, that virtual space may also be a representation of the second user's virtual space. For example, the avatar 607 may correspond to a second user in the physical space 601. Thus, where two users are interacting with each other in the same physical space, the virtual space may include a representation of both users. The display 612 could also show a split-screen display, where the virtual environment for each user is displayed separately, but on the same display device 612. A virtual object may correspond to a physical object of a second user. For example, if the user associated with avatar 607 interacts with physical ski poles, those interactions (such as moving the poles) may also be reflected in the virtual environment with respect to the corresponding avatar 607 and the virtual ski poles 609.

The props or objects used in a particular application may not correspond to a physical object, but the user can interact with the virtual objects by positioning himself properly in the physical space to correspond to a location in the virtual space. For example, if the display of a collection of balls in a bowling ball return was virtual only, but displayed in the game space of a bowling game application, a user could make a forward walking motion and turn in the physical space to control the avatar's walking and turning towards the bowling ball return displayed in the game space. By watching the displayed representation of the user, such as an avatar that is mapped to the user's gestures, the user can position himself or herself to make a ball selection. In the example shown in FIG. 6A, the ski mountain 611a is entirely virtual and does not correspond to an object in the physical space. The user 602, in FIG. 6A can align himself or herself in the physical space 601 with the virtual ski mountain 611a by observing and controlling the avatar 606 that maps to the user's 602 motions.

Figure 6B:
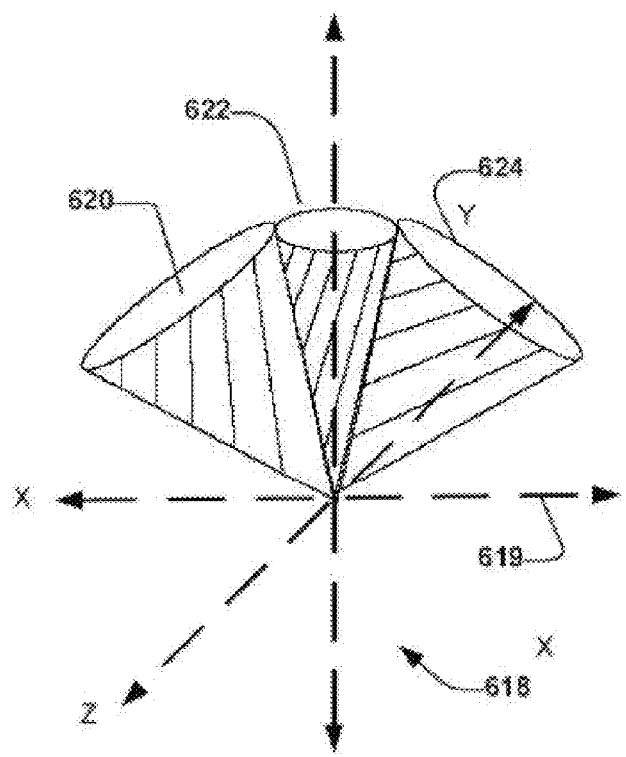
FIGS. 6B & 6C illustrate the motion of the user from FIG. 6A compared against example gesture filter data.

A user's gestures or motion may be interpreted as controls that correspond to actions in the skiing game application. It is contemplated that gestures may correspond to actions in a non-gaming context as well, such as gestures applicable to non-gaming applications, an operating system, computer interfaces, or the like. FIG. 6B illustrates information that corresponds to three gesture filters applicable to the skiing game application shown in FIG. 6A. The three volumes, 620, 622, and 624, each represent base information in the gesture filter that correspond to a different gesture for ski direction control. The volumes 620, 622, and 624 represent a 3-dimensional space that corresponds to the physical space 601 of the user. In this example, the gesture filters corresponding to each ski direction control gesture may at least in part comprise volume dimensions. For example, volume 620 represents the ski right gesture control, volume 622 represents the ski straight gesture control, and volume 624 represents the ski left gesture control.

For a user's motion to register with a gesture filter, the capture device 608 may receive data representative of the user's motion in the physical space 601 apply at least one gesture filter to the received data. The received data may be compared against the information in the filter that corresponds to a gesture. For example, if the user's capture motion corresponds in the 3-dimensional space to the spatial arrangement of one of the volumes 620, 622, 624 the user's motion may register with the corresponding gesture filter. Thus, a particular gesture may be recognized if the received data registers with the information in the filter. For example, a user leans to the right and places his or her body in a position that corresponds to volume 620, the user's motion may register with the ski right gesture control.

The registry of a user's motion and the recognition of a particular gesture control an aspect of the skiing game application, such as manipulating the movements of an avatar. For example, if the user's motion is identified as falling within the volume 620 that corresponds to the gesture filter data for a ski right gesture, then the gesture recognition may translate to a control of the avatar 606, causing the avatar 606 to ski right in the virtual space.

Figure 6C:
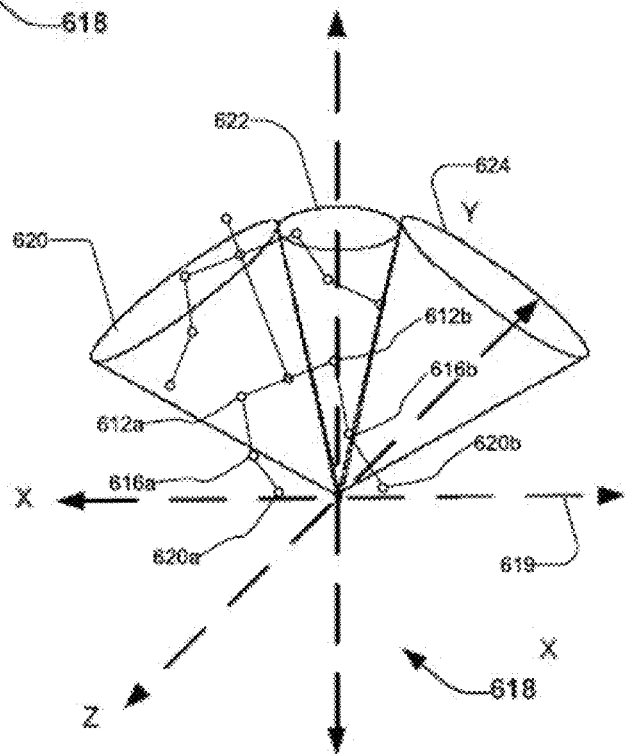

A model of the user 602 may be generated by the capture device or computing environment, such as a skeletal model, a mesh human model, a flood filled model, a depth model, or any other suitable representation thereof. The example model 630 shown in FIG. 6C is a skeletal model such as that shown in FIG. 5A, and may be used for generating a visual representation of the user 602. The user's 602 motion may be tracked such that physical movements or motions of the user 602 may act as a real-time user interface that adjusts and/or controls parameters of an application such as an electronic game.

FIG. 6C represents the comparison of the received data of the user's 602 motion from FIG. 6A, applied to the skeletal model 630, to the volume data 620, 622, and 624 in the gesture filters that correspond to each of a ski right gesture, a ski straight gesture, and a ski left gesture. For example, the gesture filter data for the ski right gesture control, represented by volume 620, is applied to the received data, where the data is representative of the user's 602 motion in the physical space. The received data may also be input into gesture filters that correspond to each of gesture volumes 622 and 624. However, in this example, the user's motion corresponds best to the volume 620 representing gesture 620, the ski right gesture control. The majority of the user's joints are within the volume 620 in the 3-dimensional coordinate system 618 that corresponds to the physical space 601. The gesture filter may also comprise information regarding the joint position of the user's legs, and recognize the bent position by analyzing the angle between the knee joints 616, hips 612 and feet 620.

The gesture identified translates to the control of the avatar 606 shown in FIG. 6A. Thus, the registry of the user's motion with the gesture filter having volume data 620 controls the skiing direction of avatar 606, in FIG. 6A, to ski down the virtual mountain towards the right. Similarly, if the user 602 had been leaning left in the physical space 601, the user's position may have corresponded to the ski left gesture control, represented by volume 624 in FIG. 6B. If the user had been in a mostly upright position, the user's position may have corresponded to the ski straight gesture control, represented by volume 622.

Figure 7A:
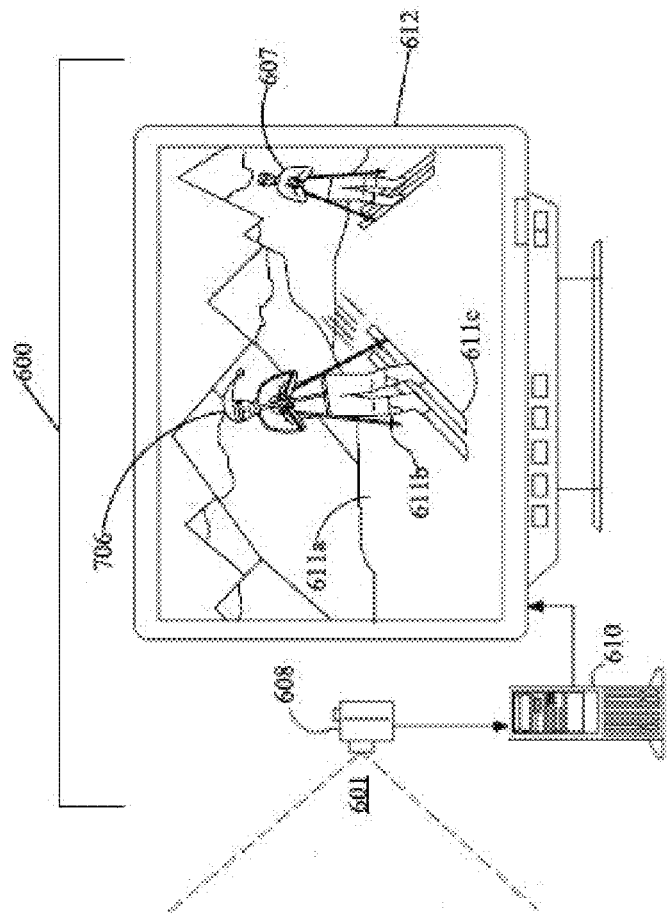
FIG. 7A illustrates another example embodiment of a computer-controlled capture device system that provides a visual representation of the user on a display.
Figure 7A:
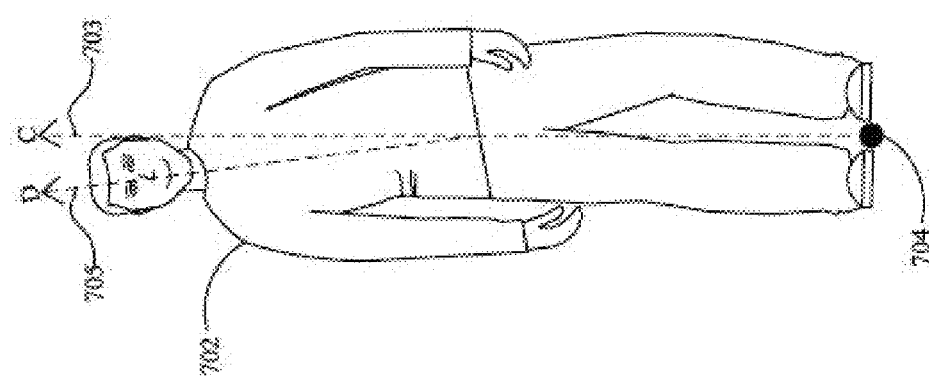

FIG. 7A illustrates the example system such as that shown in FIG. 6A that captures movement of a user 702 in a physical space and maps it to a visual representation 706 in a virtual environment. Similar to user 602 in FIG. 6A, the user 702 is playing a skiing game, where the ski mountain 611a, ski poles 611b, and skis 611c, are virtual and shown on display 612. The user 702 aligns himself or herself in the physical space 601 to correspond to the desired avatar 606 location on the virtual ski mountain 611a.

Figure 7B:
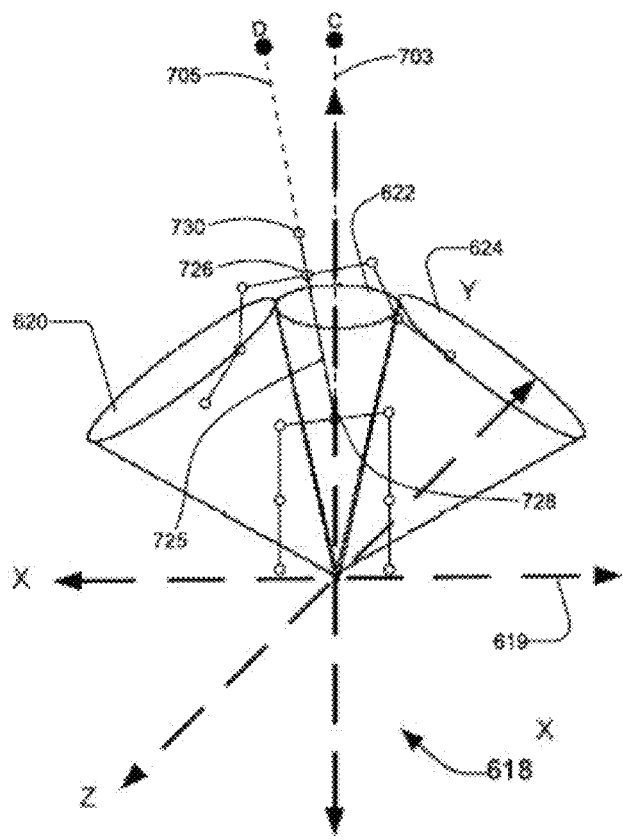
FIGS. 7B & 7C illustrate the motion of the user from FIG. 7A compared against example gesture filter data.

In this example, again, the capture device 608 may receive data representative of the user's 702 motion in the physical space 601. As shown in FIG. 7B, the system compares the received data to the volumes 620, 622, and 624, as also shown in FIG. 6B, that represent the gesture information for three different gesture filters. In this example, the user 702 is not leaning but is rather holding himself in an upright position. A natural lean, however, is detected from an analysis of the user's joints 726, 728 and spine 724, shown in FIG. 7B as captured by the system 600. A centerline C, 703, is an imaginary vertical line that extends from a midpoint 704 on the floor between the user's legs and upward through the user's body. Based on average user data, for example, the centerline C may be a reference point for a typical human posture, indicating the lower body and spinal position for someone with a straight or nearly straight posture. In another example embodiment, the user's lean is perceived due to an unbalanced capture device. For example, capture device 608 may be tilted slightly to the side, giving the perception that the user is leaning or has a natural lean when in fact the user may not be leaning or may have a straight posture. Thus, the lean identified may be a physical attribute of the user, such as a natural lean, or the lean identified may actually be a symptom of the capture device 608.

The system 600 may be able to analyze the skeletal model 730 or at least portions of the skeletal model 730 to distinguish an intended lean by the user and a natural lean or postural imbalance unique to the user. For example, the system may detect that the joints in the user's lower body is in a position expected for a normal, stand up straight posture, but the angle of the spine 725 between the joint at the base of the neck 726 and the tailbone 728 indicates that the user has a leaning posture. If the angle of the spine 725 is a recurring feature for the user, the leaning posture may be identified as a recurring feature for the user 702. Thus, by tracking history data, the system 600 can distinguish between an intended gesture motion and a recurring feature unique to the user 702. For example, consider a user who uses a cane that causes the user's upper body to lean to the right or a user that simply has a postural imbalance. The leaning position may be natural or it may be a temporary feature (e.g. the user may be using a cane or crutch temporarily during rehabilitation of an injury).

The system 600 may track history data representative of the user's motion and determine if the leaning position is intended or if it is a unique, recurring feature for a particular user. The system 600 may detect, by analyzing the history data, whether or not the leaning position changes over time. For example, the system 600 may detect that the user 702 has a recurring leaning position from an analysis of the history data, but then detect a change to that leaning position. Consider a user that uses a crutch or cane temporarily while rehabilitating from an injury. The use of the crutch or cane may effect the user's posture, causing the user's upper body position to have a lean to one side. The effect on the user's posture may be temporary, where upon rehabilitation the user returns to a straighter natural posture. The system may adjust the gesture filters temporarily based on history data for the user, and continuously update the gesture filters as changes are detected that are identified as recurring features for that user. A recurring feature may be a feature that is identified from data representative of a user's motion and is identified for a predetermined period of time, is detected upon separate instances of using the system 600, is detected when performing a particular gesture, or any other feature that is identified from the received data and persists in the data or repeats itself.

Figure 7C:
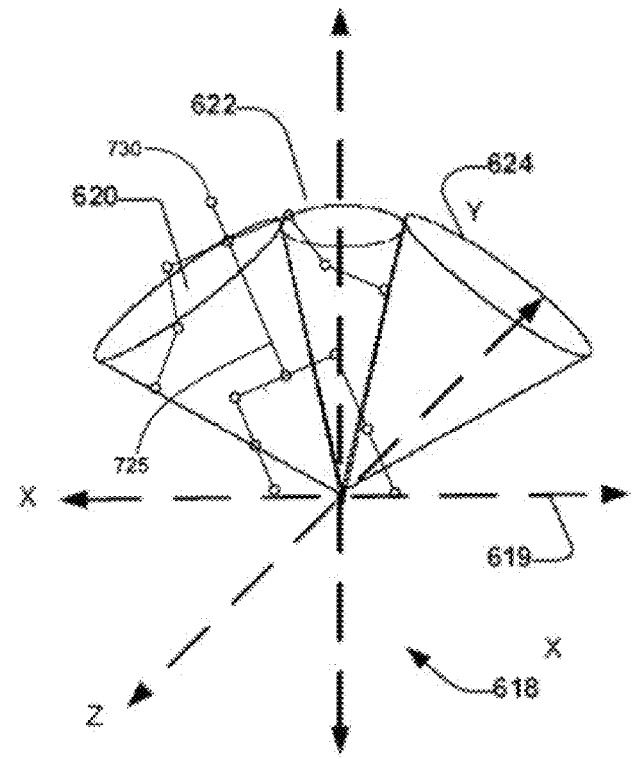

Because of a natural lean in the user's 702 posture as shown in FIG. 7C, it appears that the user 702 is leaning towards the right. The user's spine 724 is modeled by the skeletal model 730 shown in FIG. 7C, and the angle at which the user's spine 724 deviates from the centerline is represented by Line D, 705. Line D, 705, represents the user's upper body deviation from the centerline due to the angle that the user naturally holds his spine.

As described above, a model of the user, such as skeletal model 730 shown in FIG. 7B, may be generated by the capture device or computing environment. FIG. 7B illustrates the comparison of the model 730 of the user 702 to the volumes 620, 622, and 624, that correspond to the gesture filters for each of the ski right, ski straight, and ski left gestures. In this example, assume that the user 702 is standing upright to register his or her motion with the ski straight gesture control represented by volume 622. As shown in FIG. 7B, despite the user's 702 natural lean, the user's captured motion correctly registers the user's motion based on the volume 622 for the ski straight gesture control. So, while the user has a natural lean in his or her posture, the lean, in this example, does not effect the registry of the user's motion with the ski straight gesture filter represented by volume 622.

However, consider the motion by a user 702 with a natural lean that attempts to motion to register with the gesture filter with volume 620. Because of the natural lean in the user's posture, the amount of lean required for the user's 702 motion to register with the gesture filter comprising volume 620 is not as much as the lean required for a user having a straighter natural posture. Similarly, the amount of lean required for the user's motion to register with the gesture filter having volume 624, by user 702, may be larger than that required for a user with a straighter natural posture. It may be frustrating in some instances for a user to have to vary his or her motion, differently from that of other users, in order for the system 600 to recognize such gestures.

In another example, shown in FIG. 7C, the user's 702 natural lean may be significant enough that it actually registers the user's captured motion with an unintended gesture. The skeletal model 730 of the user 702 indicates a curve in the user's spine 724, that places the user's upper body into a physical space that corresponds to volume 620. The user 702 may intend to control the avatar to ski straight, but because of the user's natural lean, the user's upright position instead registers with the volume 620 that represents the ski right gesture control. In order for the user's motion to register with the ski straight gesture control, the user 702 would have to lean to the left to accommodate for the user's natural posture.

It may be desirable to isolate recurring features captured by the system 600 such that the gesture filters are adjusted to correspond to the recurring feature. In this example, the recurring feature identified by the computing system is the natural lean in a user's posture. For example, the system 600 may collect data representative of a user's motion in the physical space. Over time, the system may recognize that the user has a particular posture, and the system may adjust the parameters of appropriate gesture filters, such as those gesture filters that have a dependency on a user's posture.

Figure 7D:
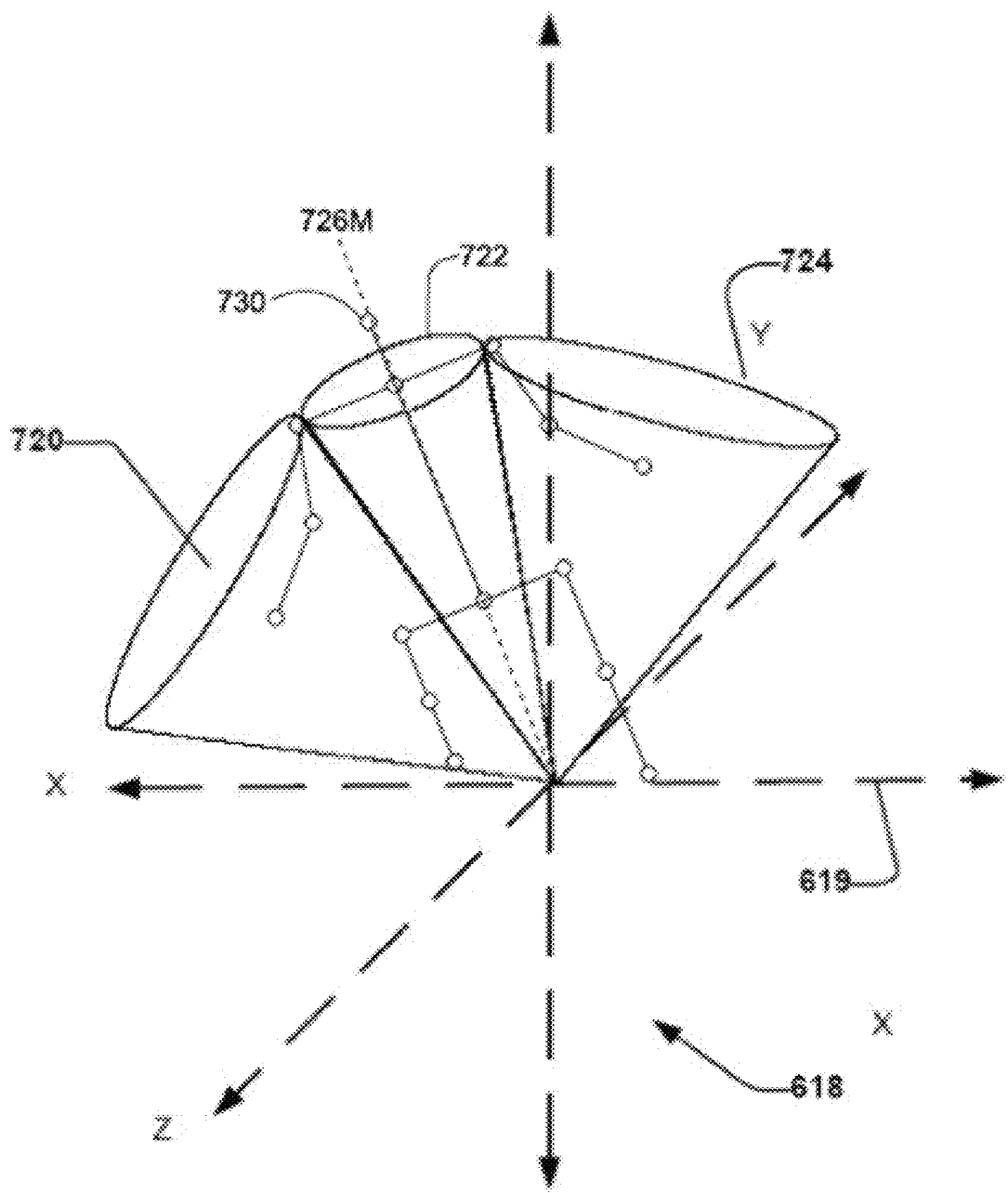
FIG. 7D illustrates an example of the gesture filter data, from FIGS. 7B & 7C, adjusted for the user shown in FIG. 7A

For example, in the example shown in FIG. 7C, it may be desirable to modify the volumes, 620, 622, and 624, that correspond to the ski right gesture control, ski straight gesture control, and ski left gesture control, respectively, in order to isolate the effects of the user's lean on the gesture identification. FIG. 7D illustrates an example of adjustments to the volumes 620, 622, and 624, from FIGS. 7B and 7C, where the center volume is aligned with the user's natural posture. The adjustments are made for each of the gesture filters that comprise base information for each of the ski direction control gestures. As shown in FIG. 7D, the volume data in the gesture filter is adjusted such that the ski straight volume 722 is centered around the midline 726M caused by the user's natural posture. The effects of the user's lean, therefore, are incorporated into the gesture filters in such a way to isolate the effects of the user's lean so the gesture filters are tailored for gesture recognition for a particular user.

The gesture filter for complimentary gestures—either complimentary as in those that are commonly used together, or complimentary as in a change in a parameter of one will change a parameter of another—may also be adjusted. For example, when the volume parameters of the gesture filter for the ski straight gesture control having a volume 622 are adjusted, a second, complimentary parameter (in the interdependent sense) of either the gesture or at least one other gesture, such as gesture volumes 622 and 624, may also be tuned such that the parameters remain complimentary. For example, the volume 620 may be modified to correspond to volume 720 shown in FIG. 7D, where the new edge of the volume 720 still corresponds to the edge of the ski straight gesture control volume 722, but is altered as a result of the adjustment to the ski straight gesture control volume 722.

Figure 8:
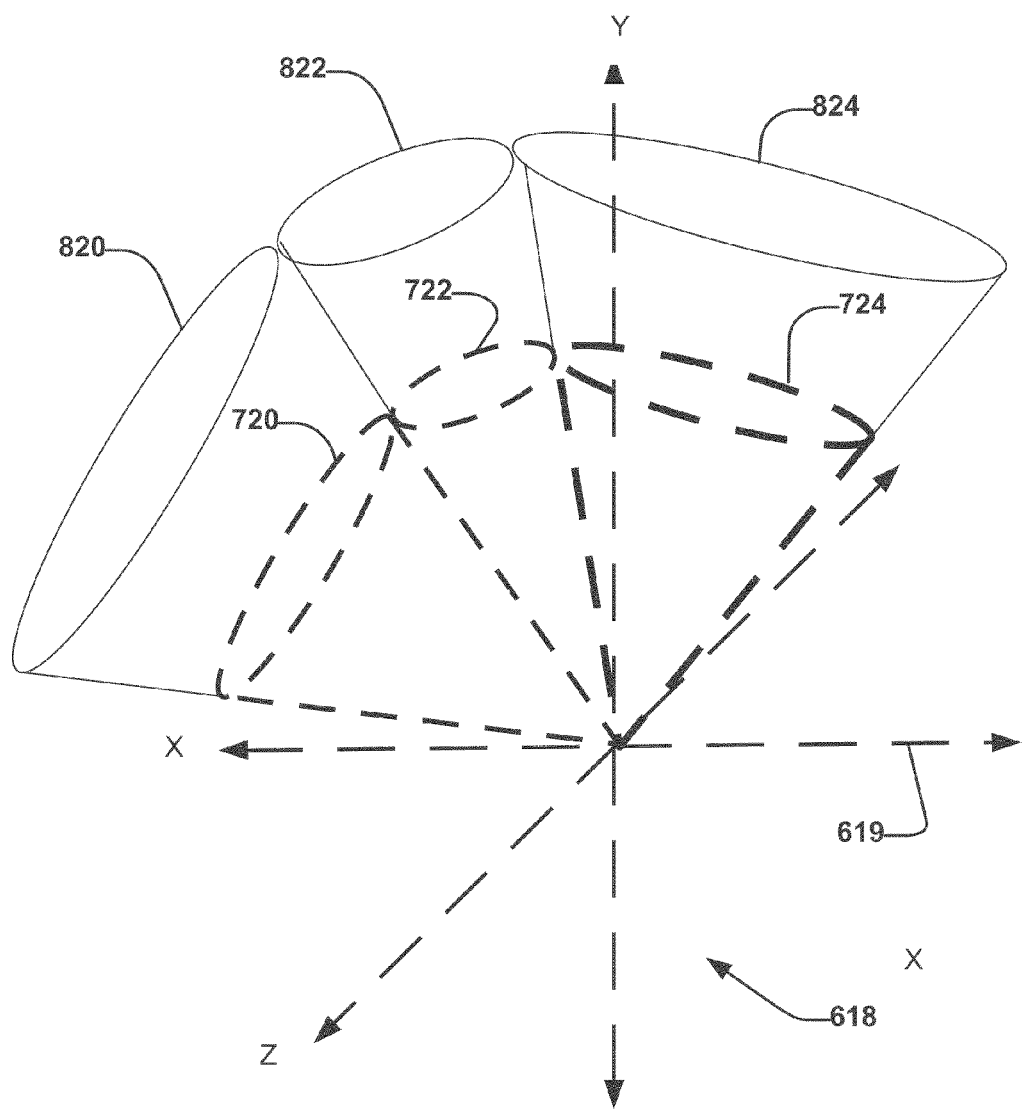
FIG. 8 illustrates an example of the gesture filter data from FIG. 7D further adjusted for a user.

FIG. 8 depicts an example adjustment to gesture information, such as an additional adjustment to the volumes 720, 722, and 724 from FIG. 7D. Each of the gesture filter volumes 720, 722, and 724 correspond to a user such as user 702 shown in FIG. 7A. As shown, each of the volumes are adjusted as a result of the user's lean identified from the recurring upper body and spinal position of the user 702 in the physical space 601. A user that is taller than user 702, however, may require gesture filters data that correspond to motions for a taller person. The adjusted volumes 820, 822, and 824 in this example are made based on the recurring features of a user's natural lean such as that of user 702, but also the user's size. Thus, in this example the system also identifies the user's size as recurring feature.

For example, the system 600 may collect data representative of a user's motion in the physical space 601. The user's upper body may be tracked by a capture device. Because the volumes, 720, 722, and 724, correspond to a shorter person, the upper body motion of the taller person may occur outside the 3-dimensional space that corresponds to each of the volumes 720, 722, and 724. As a result, the user's motion may not register properly with the intended gesture. Over time, the system may recognize that the user is a particular size, and thus adjust the parameters of appropriate gesture filters that have dependency on a user's size. An example adjustment to each of these filters to correspond to new volumes, 820, 822, and 824, may apply for a taller user such that the user's height is isolated such that the height does not cause a failure in the registry of the user's motion with the available gesture filters. Thus, the motion of a tall user can register with a particular gesture filter associated with a volume, such as volumes 820, 822, and 824, in the same manner that a shorter user's motion registers with the gesture filters associated with volumes 720, 722, and 724, respectively.

Figure 9A:
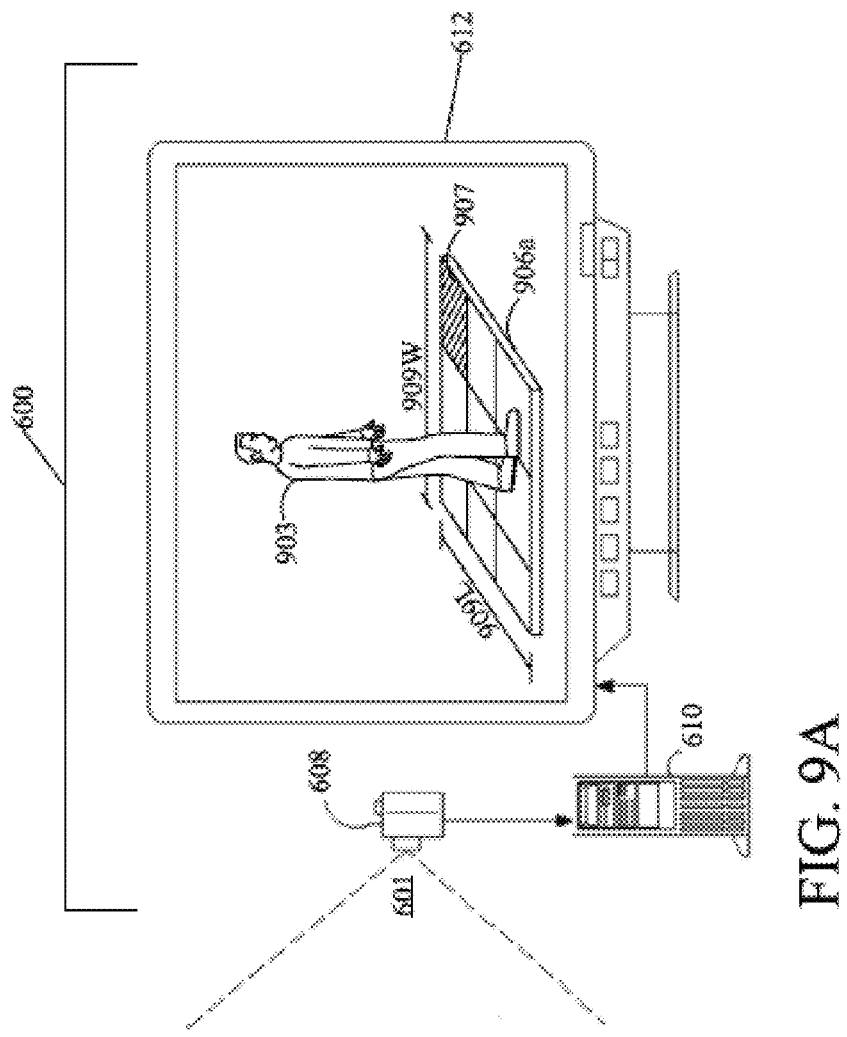
FIGS. 9A & 9C illustrates another example embodiment of a computer-controlled capture device system that provides a visual representation of the user on a display.
Figure 9A:
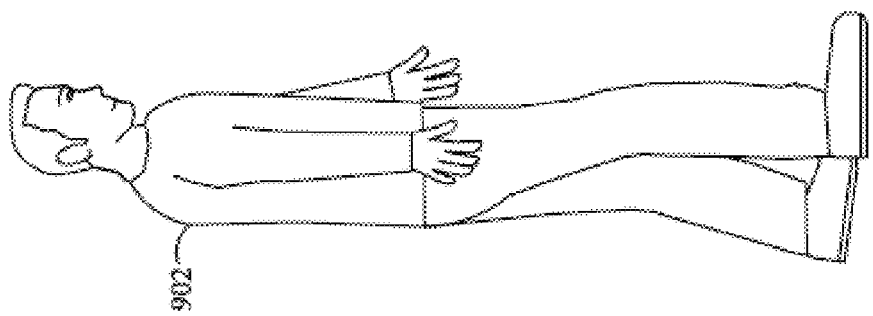

The adjustments made to the gesture filters may translate to modifications of other aspects of gesture recognition and display. FIGS. 9A and 9C depict an example of a user 902 playing a dancing game on a system 600 such as that shown in FIG. 6A. During execution of the dancing game, a virtual dance pad 906a is displayed on the screen 612. The objective of the dancing game is that users 902, 904 shown in FIGS. 9A and 9C, respectively, move to control the avatar's movement on the screen 612 from square to square on a virtual dance pad 906a, 906b to cause different dance moves. The movement into a square, that may be prompted by the dancing game, may correspond to gestures that cause success or failure in the dancing game. For example, the dancing game may direct the user 902 to enter square 907 on virtual dance pad 906a. If the user 902 moves forward from the initial position, that is aligned with the center of the virtual pad 906a, and enters into the space above square 907, making contact with the physical floor that corresponds to the virtual surface of square 907, for example, the gesture for stepping in square 907 may be recognized. If the dance game prompts the user to step in square 907, however, the recognition of the gesture for stepping onto square 908 may result in a failure in the dancing game.

Figure 9B:
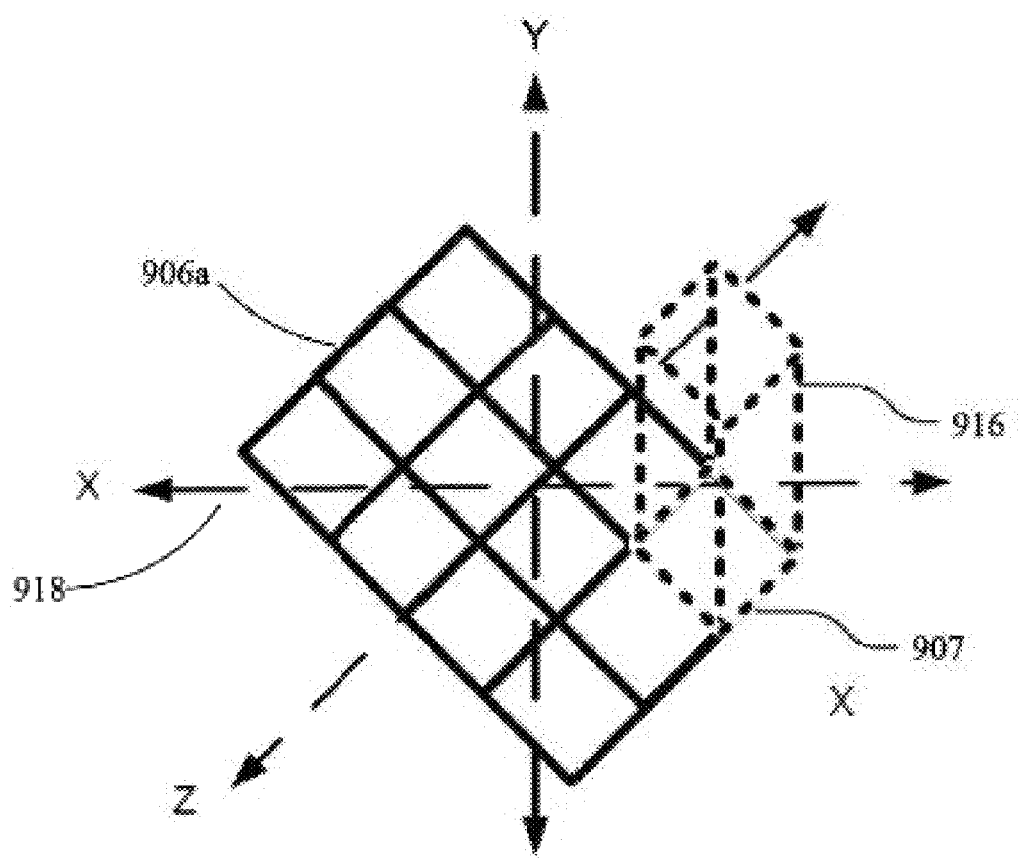
FIGS. 9B and 9D illustrate gesture filter data corresponding to the application executing on the systems shown in FIGS. 9A & 9C, respectively.
Figure 9C:
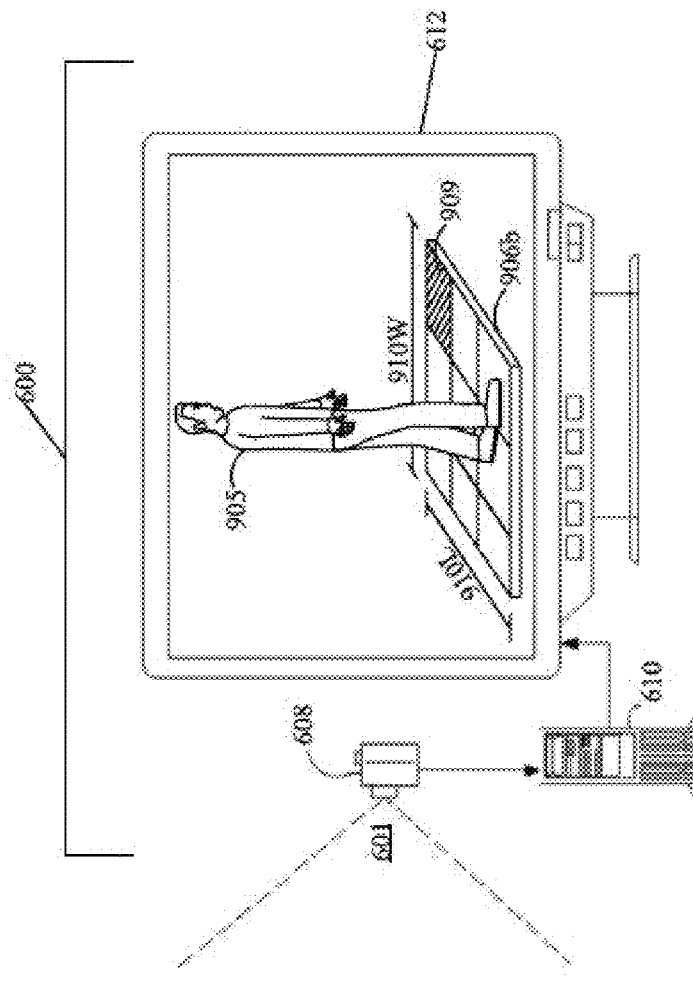
Figure 9C:
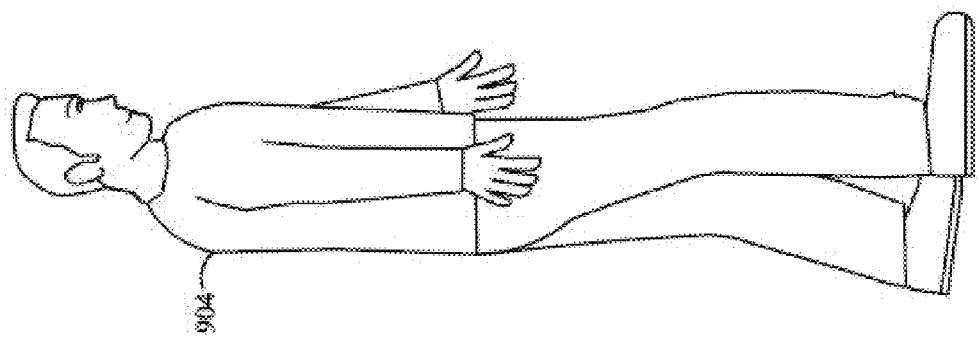

FIG. 9B illustrates the virtual dance pad 906a in a 3-dimensional coordinate system 918 that corresponds to the 3-dimensional space of the user 902. Thus, as the user 902 moves in the physical space, the motions may be translated to correspond to the virtual dance pad. Volume 916 represents the gesture filter data that corresponds to the gesture for controlling the movement into square 907. Volume 916, for example, may be defined in a gesture filter by a volume above and at the surface of a virtual square, which corresponds to a volume in the physical space 601 in which the user 902 moves. The user's motion may be translated to correspond to the virtual dance pad 906a displayed on the screen 612. Upon start-up of the dancing game application, the user's 902 position in the physical space 601 could be initialized to correspond to the virtual dance pad 906b. For example, the user's initial position may be a reference point, the initial position being aligned with the center of the virtual dance pad such that movements thereafter can be identified based on the deviation from that reference point.

From a history of data, the system may identify any number of recurring features for the particular user 902. For example, the user's 902 size may be identified from the collection of history data representative of user's 902 motion. In the dancing game, for example, each gesture filter for each square may be adjusted to correspond to the user's 902 size. The various gesture filters for the virtual grid of squares 906a may comprise an area defined for each square and between squares that is adjusted according to the user's size. The virtual squares of grid 906a may be defined in size to correspond to the user's 902 leg span and height (recurring features identified from the history of data). In this manner, the gesture filters for the virtual grid 906a are tailored to the specific user 902. These changes to the gesture filters that correspond to the history of data may be stored in a profile associated with the user 902.

Figure 9D:
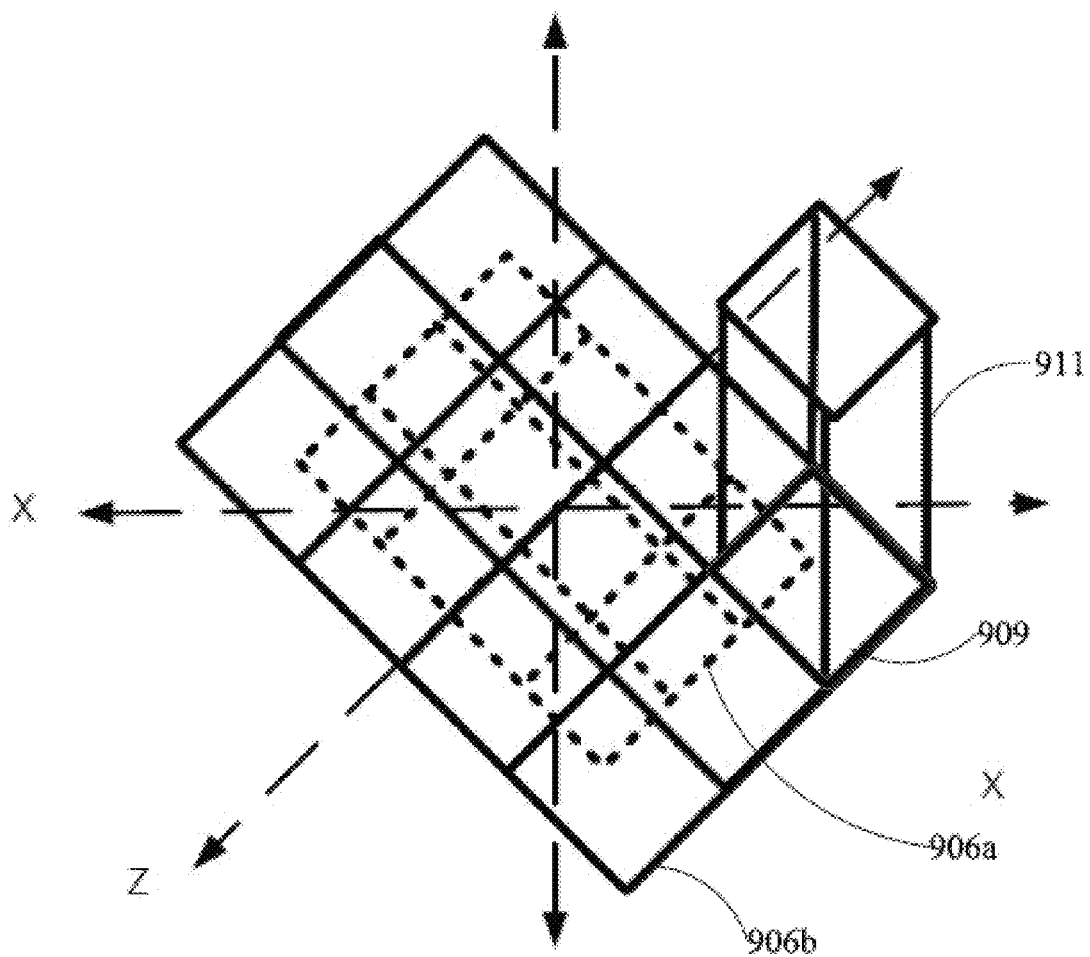

FIG. 9C depicts an example of a user 904 playing the same dancing game as user 902, where a virtual dance pad 906b is displayed on the screen 612. However, the user 904 is taller than user 902 and has a wider leg span and mobility in the legs. Thus, as shown in FIG. 9C, the system uses the identity of the user's 904 capable leg motion and leg span from the history of data to adjust size and width of the virtual dance pad 906b. The adjustments to the virtual dance pad 906b correspond to adjustments to the gesture filter data. For example, as shown in FIG. 9D, the virtual grid of squares 906b may therefore be larger in size than the virtual grid of squares 906a that corresponds to user 902. The volume data above a particular square, such as square 909, may also be modified according to the user's features.

The information about the user's size, mobility, etc, may be stored in a profile associated with the user. Similarly, any changes made based on these detected recurring features may be saved (e.g., the size of the virtual grid 906a, 906b tailored to the user's size, may be stored). In this manner, the system 600 may initialize the system or an application using the profile data for the user.

An adjustment to accommodate the recurring feature of the user may result in a more positive experience for each user. For example, if the user 902 had to motion in the physical space to correspond to the virtual pad 906b that is tailored to the taller user 904, user 902 may get frustrated because the motion necessary for gesture recognition is more challenging than it would be if the virtual grid corresponded to the user's 902 size. Consider the example where the virtual grid of squares is part of an exercise application. If the taller user 904 had to interact with the smaller virtual grid of squares 906a, user 904 may not have a positive experience with the exercise application because the minimal movement required by the user 904 to move the avatar 905 from square to square may not provide a sufficient level of exercise. If the virtual grid of squares was not adjustable, the users 902 and 904 may have different experiences based on the size of the grid of squares. It may be desirable to adjust the gesture filters to correspond to recurring features of a particular user such that the gaming experience is more similar between users and prevent aspects of the application to be the cause of varying successes or failures between users.

It may be desirable that the adjustments to the gesture filters are continuously updated based on the recurring features identified from a history of data for a user. For example, a history of data may indicate that user 902 is becoming more agile or flexible, and can more easily move between the grid of virtual squares 906. Depending on the context or objective of the application, the gesture filters may be adjusted to accommodate the user's motion tracked through history. For example, in an exercise application, if the system recognizes that the user's motion is more fluid and gesture recognition from the motion between squares is occurring more quickly, it may be desirable to make the exercise application more challenging to the user by increasing the size of the squares, thereby requiring additional movement by the user to achieve gesture recognition in the application. The objective of a more challenging exercise, therefore, maybe achieved by making adjustments to the gesture filter data.

In some scenarios, certain motion or motions are not applicable to a gesture or for gesture recognition. For example, a user's lower body motion is not applicable to a gesture filter comprising information for a waving "hi" motion. It may be desirable to eliminate or reduce the effects of extraneous motion on the process of gesture recognition. The extraneous motions may include extraneous motions of a particular user's body part or extraneous motion of other targets (e.g., other users, objects) in the scene.

Figure 10A:
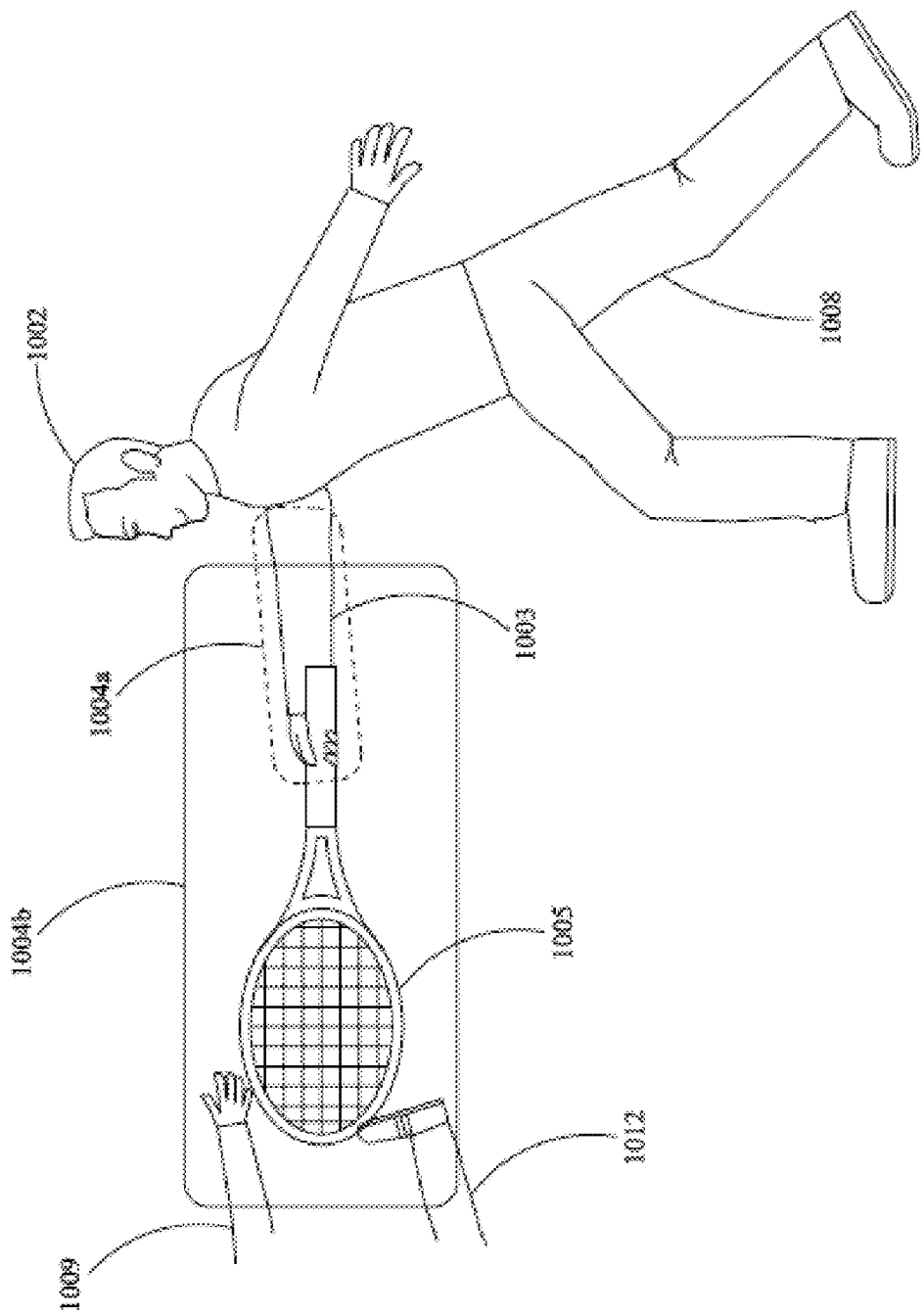
FIGS. 10A-10C illustrate an example of gesture filter data in the form of a volume with respect to a user.
Figure 10B:
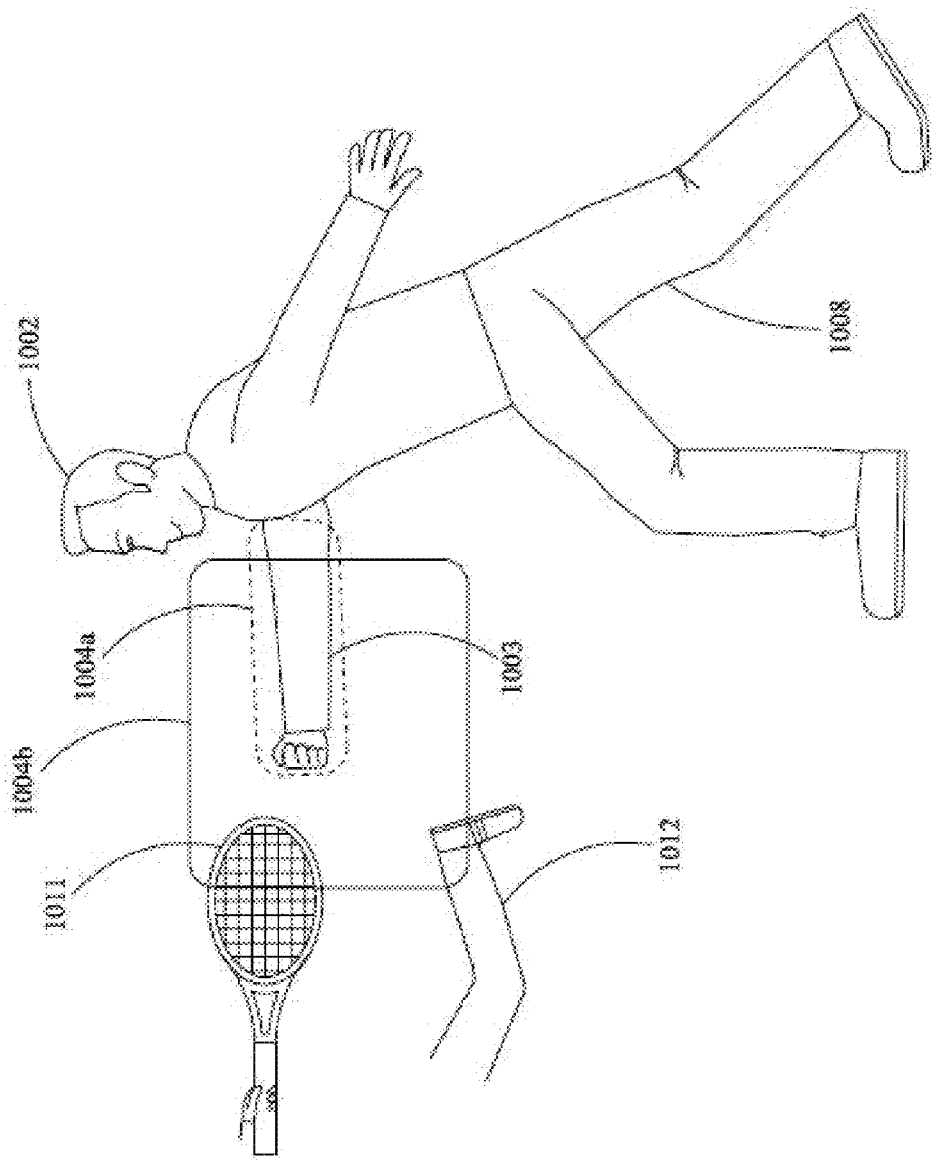
Figure 10C:
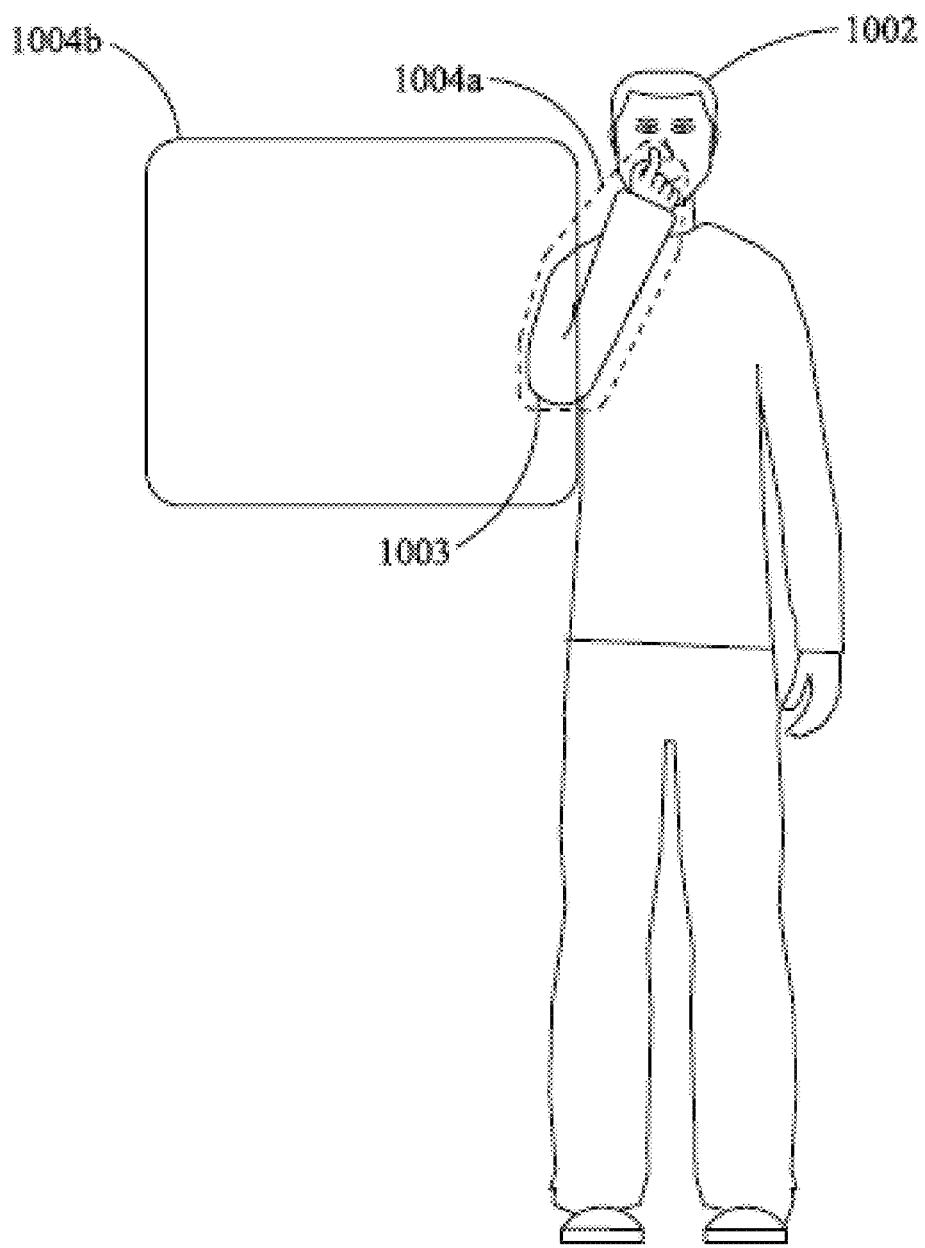

FIGS. 10A-10C depict another example embodiment for isolating movement for purposes of gesture recognition and/or display. FIGS. 10A-10C depict a user playing a tennis game. FIG. 10A represents the motion of a user 1002 that corresponds to a forehand tennis swing, where the user is holding a tennis racquet 905 in the physical space. FIG. 10B represents the motion of a user 1002 that corresponds to a forehand tennis swing, where the tennis racquet is virtual. In both FIGS. 10A and 10B, the gesture filter for a forehand tennis swing comprises base information for the gesture. The base information for this example right-handed user 1002, may be focused on a volume 1004a that surrounds the user's right forearm and hand and volume 1004b that encompasses a space around the user's right forearm that includes the space for a typical forearm motion in a tennis swing. In this example, the volume 1004b also includes volume data for a physical tennis racquet 905 that the user is holding in the physical space.

For example, according to an example embodiment, a system may receive data representative of a user's 1002 motion in the physical space. The capture device or a computing device coupled to the capture device, such as computing system 1019, may identify a target in the scene or interpret the captured motion. In an example embodiment, the capture device may be a depth camera configured to obtain depth information associated with the one or more targets in the scene using any suitable technique such as time-of-flight analysis, structured light analysis, stereo vision analysis, or the like. Further, the depth information may be pre-processed, either as a depth image generated from depth data and color data, or even parsed depth image data, such as having skeletal mapping of any user in the image.

The gesture for the forehand tennis swing comprises motion of the user's right hand. The gesture filter data includes a volume 1004b that is generated to the right of the user and around the user's right arm, corresponding to the space a user would move the arm to perform a forehand tennis swing. The system may identify the skeletal structure of the user 1002 to focus the information in the gesture filter to correspond to the users' bones that make up the user's right arm and forearm, represented by the volume 1004a. Each of the bones of the body may be delineated and select bones may be the focus of a gesture filter. For example, the volume 1004a is generated around the bone structure of the user's 1002 right hand and forearm, 1003. Dimensions of a volume 1004a generated around the bone structure may be set to correspond to the volume in which a user's right hand and forearm 1003 move during a forehand tennis swing. If the user's 1002 motion is compared against the gesture filter information, and comprises motion within that volume matching the parameters in the gesture filter, the forehand tennis swing gesture may be recognized with a certain confidence.

The system may collect history data representative of a user's gestures and fine tune gesture filters to correspond to the history data. The history data may be used to shrink the bandpass of the filter to further identify and extract extraneous motion. For example, considering the forearm tennis swing gesture, the system may identify a recurring feature of the motion, such as a repeated arm motion, velocity, tennis racquet size, or the like. The use of the history data and identification of recurring features may allow the system to focus the parameters of the volume 1004b for the forearm tennis swing gesture or the volume 1004a specific to the user's bone structure. Each volume may be a zone of interest to which a user's motion is compared during gesture recognition. The focused volumes 1004a, 1004b may extract even more extraneous motions and create an even more robust gesture identification system.

Zones of interest, or volumes, 1004a, 1004b, may be redefined over time. If the same user 1002 throws a ball in a similar manner each time, the history will help define the volumes and refine the exclusion and/or isolation of certain motions. For example, skiing control described with respect to FIGS. 6 and 7, such as a direction left or right, may be identified by a standard gesture filter that identifies the user's motion comprising leaning to the left or right in the physical space. If the user has a natural posture that leans to the right, over time the user's natural position will help fine tune the parameters. Thus, the user's center of gravity may be identified, and the amount of lean to the left or right that may identify the control of a left or right lean in the skiing application, may be redefined around the user's center of gravity. A volume specific to the user's bone structure, such as volume 1004a, may be focused around the user's natural lean to more specifically correspond to the user and better extract extraneous motion. Thus, the extraneous motion may be the user's natural posture, and by redefining the center line based on the user's posture, the posture variation is extracted from the analysis of the lean to the right or left. The influence of the user's lean is extracted from the gesture analysis.

The filter may identify the user's natural lean and track the user's skeleton over time. The filter is a chunk of code that includes the last x time of a user's positions. Filter evaluates that data, and filter is specified for a particular gesture (baseball throw, catch, hitting). A confidence ratio that a gesture occurred may be indicated by a fractional value from 0-1. In the case of a "lean" filter, the filter takes the join at the base of the spine and a joint at the top of the spine, and measures that angle. For example, it may be determined that a user has a natural lean of 5 degrees, for example, based on the bone structure that has been scanned in for the user.

The system may focus a gesture filter on data other than the skeletal structure of a user. For example, a particular physical object may be a certain color and gesture filters may be set in accordance with the motion of that item based on its color, where an RGB camera may identify the color. The gesture filter may be set based on characteristics of a fluid filled model of a target. For example, a fluid filled portion of the model that resembles the user's forearm and arm may be the subject of a gesture filter for identifying the right hand tennis swing gesture.

The capture device may receive data representative of extraneous motion in the scene and/or within a volume 1004b that corresponds to the example gesture filter for the forearm swing. For example, other parts of the user 1002 may be extraneous motions, such as the lower body motion represented by 1008. The system may ignore or exclude the consideration of the user's other body parts based on the skeletal model generated of the user. For example, a skeletal model may be indicative of the user's arms, legs, head, torso, etc. Simply by focusing on only the user's right hand and forearm represented by a volume 904a the gesture filter can exclude extraneous motions that occur on other body parts by analyzing the skeletal model. Even if a user's leg, for example, enters the volume of interest 1004b, because the leg is not the identified bone structure of interest shown in volume 1004a, the leg motion may be excluded as an input into the gesture filter. Other users or other target motion in the scene, such as the motion of another user's arm 1009 or leg 1012, may be excluded because the motion does not fall within the volume 1004a. Similarly, the skeletal model indicative of the user's right hand and forearm 1003 may be sufficient to exclude the extraneous motion coming from another user 1009, or target, because an analysis of the user's 1002 skeletal model indicates that the arm 1009 or leg 1012 are not part of user 1002 and can therefore be ignored.

As shown in FIG. 10A, the tennis racket may be a physical object 1005 in the scene that the capture device tracks and maps to a visual representation. Thus, the virtual tennis racket displayed in the avatar's hand corresponds to the physical tennis racket 1005. A volume of interest 1004b set for a gesture filter for a forearm swing may include a volume around a physical object held by the user. Alternately, the virtual tennis racket may not correspond to an object in the physical space and may be entirely virtual. In FIG. 10B, the tennis racquet is entirely virtual and thus volume 1004b represents the volume that the user's hand and forearm move through when gesturing, without compensating in size for the detection of the racquet's movement in the physical space. Thus, the size of the volume 1004b, therefore, may vary according to the size or existence of a physical tennis racket.

In FIG. 10A, where the tennis racquet 1005 represents an object in the physical space, the capture device may receive data representative of extraneous motion in the scene and/or within the volume 1004a that corresponds to the example gesture filter for the forearm swing. For example, other parts of the user 1002 may be extraneous motions, such as the lower body motion represented by 1008. The system may ignore or exclude the consideration of the user's other body parts based on the skeletal model generated of the user. For example, a skeletal model may be indicative of the user's arms, legs, head, torso, etc. The racquet that corresponds to the user 1002 is identified by analyzing the skeletal model of the user, and the racquet that collides with the user's right hand bone structure in the physical space is identified as the user's 1002 racquet 1005.

Based on the analysis of the skeletal model and proper identity of a physical object 1005 that is associated with the user 1002, the system may exclude any extraneous motions that occur on other body parts or by other users or targets. In FIG. 10B, other users or other target motion in the scene, such as the motion of another user's racquet 1011 or leg 1012, may be excluded because the motion does not fall within the volume 1004a or 1004b and does not correspond to the user's right hand and forearm. The volume generated from the skeletal model indicative of the user's 1002 right hand and forearm and the physical tennis racquet 1005 may be sufficient to exclude the extraneous motion coming from another user 1009 or 1010 because an analysis of the user's 1002 skeletal model and identity of the racquet 1005 indicate that the racquet 1011 or leg 1012 are not part of user 1002 and can therefore be ignored.

Alternately, rather than exclude the analysis of extraneous motion during gesture identification, the extraneous motion for a particular user may be included in the analysis of the user's motion. For example, in the forearm tennis swing gesture, other parts of the user's body may move in different ways throughout the forearm tennis swing. For example, if the user is reaching for a low ball, the user's lower body may include a bent over or bent leg position. Similarly, if the user is reaching high to swing at a high ball, the user may jump while swinging for a forearm tennis swing gesture. The user's motion of body parts other than the focused body part may have an effect on the parameters of the focused body part. For example, when reaching for a low ball, the user may not have as much velocity on the swing, or when reaching for a high ball, the user may have a tendency to straighten out the arm at the elbow and have less bend then at other times. Thus, the system may track the user's motions, and identify recurring features that are different for even a single gesture under identifiable circumstances, such as the jumping or bending motion.

FIG. 10C depicts another example of extraneous motion that may be identified and excluded from the gesture analysis. For example, the user's 1002 right arm and forearm 1003 in the tennis application are the focus for purposes of gesture recognition. The volume of interest is shown as volume 1004b, which is the volume of space that the user's right arm and forearm would move in to perform a forehand tennis swing gesture. During the tennis game application, despite the analysis and identity of the user's arm and forearm within volume 1004a, certain motions of the user's arm and forearm may be excluded from input into a gesture filter. For example, the user's arm and forearm 1003 may exit the volume of interest 1006 when the user scratches his or her nose with the user's right hand.

The system may initially identify a user's motion through the volume 1004b as a forehand tennis swing gesture, but as the user 1002 continues to motion in the volume 1004b and then out of the volume 1004b (to scratch his or her nose), the system may abort the recognition of the forehand tennis swing gesture. For example, if a gesture recognition engine identifies the start of a particular gesture, but then the motion turns into something else, the initiation of an evaluation of the motion against the particular gesture filter may be aborted. Consider if the user 1002 begins a throwing motion, but then scratches his or her nose—the gesture filter can be sensitive to the change and cause a break in the display of the particular gesture. If the user's motion is mapped to the screen when a gesture is identified, but the recognition of a particular gesture aborts, the display of the user's motion may be aborted also. Thus, the scratch of the nose would not be seen.

The system may include the velocity or acceleration of the user's arm in the analysis of the user's motion to determine the intended gesture. For example, the velocity of a user's arm 1003 when motioning to scratch the nose or to stretch our the right arm may vary sufficiently from the parameters in the gesture filter for the velocity corresponding to a forearm tennis swing gesture. Thus, it is contemplated that the gestures may be defined in the gesture filters using any detectable characteristics, and the comparison of the gesture filter with the detected characteristics can be used herein for detecting extraneous motions and isolating select aspects of the received data.

Throughout the examples described herein, the system may collect a history of data that is representative of the user's motion in the physical space. The history of data may become part of a profile, and the history data for a user may be monitored, storing information to the user's profile. For example, the system may detect recurring features that are specific to the user, such as the user's size, mobility, behaviors, speech patterns, emotions, sounds, or the like. The history of data could be a history of skeletal data specific to a user, where tracking the movements of a skeletal model generated from the skeletal data may be collected. As a user performs actions or gestures, the system can learn how the various parts of the corresponding skeletal model move. The system can use this information to understand the user's movements such that certain actions may be ignored or deemed extraneous. These certain actions may be isolated such that they are eliminated from an analysis for gesture identity. Or the actions may be isolated for the purpose of including the motion into consideration such that the gesture filter is modified to isolate the identified action. Gesture filter information that corresponds to a gesture may be modified to account for or reduce the effects of recurring features. Similarly, adjustments to gesture filters may be made in accordance with a user skill or skill settings.

Thresholds can be adapted to the user's skill or skill settings. The parameters may be fine tuned depending on a user's skill or skill settings. For example, depending on a users skill level, different threshold parameters may apply such that wider tolerances are allowed for a less experienced level of skill. Thus, a larger amount of motion may be isolated and/or excluded for purposes of identifying a gesture. A small child with motion all over the place can therefore play with a professional baseball player who has all the right moves, and there widely varying motions may register as the same gesture, where the small child's extraneous motions are isolated for purposes of gesture identity.

A profile may be specific to a particular physical space or a user, for example. The modifications made based on recurring features may be stored in a profile. Avatar data, including modifications made, may become part of the user's profile. A profile may be accessed upon entry of a user into a capture scene. If a profile matches a user based on a password, selection by the user, body size, voice recognition or the like, then the profile may be used in the determination of the user's visual representation. The profile may be loaded for an application or it may be loaded globally, such that the profile information is available system-wide.

Figure 11:
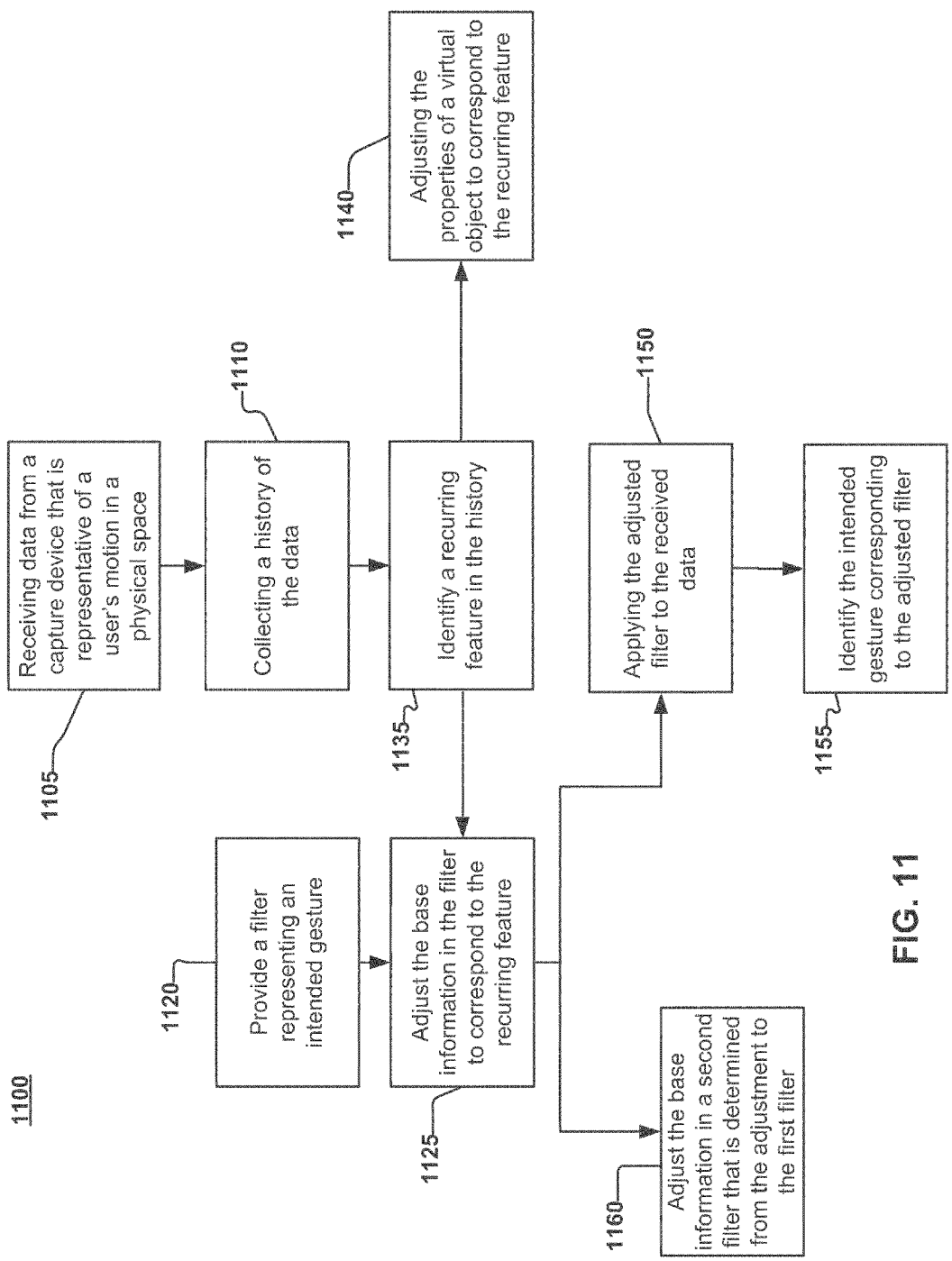
FIG. 11 depicts a flow diagram for a method of applying an adjusted gesture filter to data received by a capture device system

FIG. 11 depicts an example flow diagram representing a method for adjusting base information in a filter to correspond to a recurring feature in the received data. FIG. 12 depicts an example flow diagram representing a method for applying a filter to a portion of received data. In both systems, at 110 and 1205, respectively a system, such as any of the systems described above, may capture a target or a target's motion in the physical space.

The example methods 1100, 1200 may be implemented using, for example, the capture device 20 and/or the computing environment 12 of the target recognition, analysis, and tracking system 10 described with respect to FIGS. 1A-2 or the system 600 shown in FIG. 6. According to an example embodiment, the target may be a human target, a human target with an object, two or more human targets, or the like that may be scanned to generate a model such as a skeletal model, a mesh human model, or any other suitable representation thereof. The model may then be used to interact with an application that may be executed by the computing environment 12 described above with respect to FIGS. 1A-1B. According to an example embodiment, the target may be scanned to generate the model when an application may be started or launched on, for example, the computing environment 12 and/or periodically during execution of the application on, for example, the computing environment 12. A capture device, such as captured device 20, may receive image data about a scene, the image data may be parsed and interpreted to identify a target in the scene. A series of images may be interpreted to identify motion of the target.

According to one embodiment, a computer-controlled camera system, for example, may measure depth information related to a user's gesture. For example, the target recognition, analysis, and tracking system may include a capture device such as the capture device 20 described above with respect to FIGS. 1A-2. The capture device may capture or observe a scene that may include one or more targets. In an example embodiment, the capture device may be a depth camera configured to obtain depth information associated with the one or more targets in the scene using any suitable technique such as time-of-flight analysis, structured light analysis, stereo vision analysis, or the like. Further, the depth information may be pre-processed, either as a depth image generated from depth data and color data, or even parsed depth image data, such as having skeletal mapping of any user in the image.

In the flow diagram shown in FIG. 10, at 1100, the capture device or a computing device coupled to the capture device, such as computing environment 12, may collect a history of data representative of the user's motion in the physical space. In an example embodiment, the computing environment 12 generates a model of the image data. If a target is identified as a human, the capture device may perform a scan of the target to generate a skeletal model, such as that shown in FIG. 5A.

As described above, the target may include the user 602 described above with respect to FIG. 6. The target 602 may be scanned to generate a skeletal model 630 of, for example, the user 602 that may be tracked such that physical movements or motions of the user 602 may act as a real-time user interface that adjusts and/or controls parameters of an application such as an electronic game. The human target may be scanned to provide measurements such as length, width, or the like associated with one or more body parts of a user such as the user 602 described above with respect to FIG. 6, such that an accurate model of the user may be generated based on such measurements.

For example, as described above, the target may include the user 18 described above with respect to FIGS. 1A-1B. The target may be scanned to generate a skeletal model of, for example, the user 18 that may be tracked such that physical movements or motions of the user 18 may act as a real-time user interface that adjusts and/or controls parameters of an application such as an electronic game. For example, the tracked motions of a user may be used to move an on-screen character or avatar in an electronic role-playing game; to control an on-screen vehicle in an electronic racing game; to control the building or organization of objects in a virtual environment; or to perform any other suitable controls of an application.

At 1035, the system may identify a recurring feature in the history of data. For example, an analysis, over time, of a skeletal model that maps to a user may be indicative of a recurring features, such as a user's size or posture. At 1120, a filter may be provided that represents an intended gesture. The intended gesture may be determined by comparing the received data to a plurality of gesture filters. The gesture filters may each comprise base information for at least one gesture. The received data may correspond to at least one of the gesture filters, where the received data correlates to the information in the gesture filter. The prediction of an intended gesture may be a selection of the gesture that corresponds to a gesture filter having base information that best corresponds to the received data. For example, as described above, a confidence rating may indicate how well the base information corresponds to the received data. The intended gesture may be the gesture corresponding to the gesture filter that results in the highest confidence rating when compared to the received data.

At 1120, the system may adjust the base information in the filter representing the intended gesture. The adjustment may be a modification to the base information to isolate or exclude a recurring feature identified from the received data. For example, a user's height may be identified from the history data. A gesture filter that comprises information effected by a user's height may be modified to reflect the user's height. The gesture filter information is tailored to the user and specific characteristics of the user. Thus, the effect of various user's heights on a standard set of gestures may be reduced or eliminated as the gesture filters are tailored to each user. The difference in height between users, therefore, is not a deciding factor for success or failure to perform a gesture in the physical space. In this manner, users of any height can have a similar experience in the application or system without each user having to modify the motion in a different way in order for the motion to register with a gesture filter.

At 1150, the system may apply the adjusted filter to the received data. Thus, the tailored gesture filter is now applied to the received data, where the gesture filter is tailored to more properly recognize gestures from the received data applicable to that user. At 1155, the system may identify, by applying the adjusted filter to the received data, the intended gesture that corresponds to the adjusted filter. The system may also adjust the properties of virtual objects to correspond to a user's recurring feature. For example, as described above, the virtual squares of a virtual dance pad or a virtual exercise technique may be modified according to a recurring feature of the user.

FIG. 12 depicts a flow diagram for selecting a portion of the received data that is applicable to the intended gesture. For example, following receipt of the data representative of a user's motion in the physical space, at 1210 the system may predict an intended gesture from the received data as described above. At 1225, a first portion of the received data, that is applicable to the intended gesture predicted at 1210, may be selected. At 1240, the system may identify a second portion of the received data that is not applicable to the intended gesture. At 1220, the system may provide a filter representing the intended gesture and at 1230 the system may apply the filter to the first portion of the received data selected at 1225. At 1250, the system may use the first portion of the received data, selected at 1225, to generate a model of the user that maps to the received data. The model may map only to the selected first portion of the received data. The portion excluded, at 1240, may be represented by a pre-authored animation and applied to the model. For example, if the first portion of the received data corresponds to a user's forearm and hand in a tennis swing, the model may map to the motion of the user's forearm but a pre-authored animation may be input for the portion of the received data excluded from the filter.

At 1235, the system may determine an output of the filter. For example, 1255 is an example embodiment where the output may be a failure of the first portion of received data to register with the gesture filter. In another example embodiment, at 1260, the output of the filter is a recognition of the intended gesture. Thus, the first portion of the received data selected at 1225 registers with the gesture filter applied at 1230. Following the recognition at 1260, the system may abort the recognition of the gesture at 1265 if the first portion of the received data deviates from the gesture filter information.

It is noted that the gesture-based system described herein is described with regards to an application, such as a game. However, it should be understood that the system may interpret target movements for controlling aspects of an operating system and/or application that are outside the realm of games. For example, virtually any controllable aspect of an operating system and/or application may be controlled by movements of the target.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Furthermore, while the present disclosure has been described in connection with the particular aspects, as illustrated in the various figures, it is understood that other similar aspects may be used or modifications and additions may be made to the described aspects for performing the same function of the present disclosure without deviating therefrom. The subject matter of the present disclosure includes all novel and non-obvious combinations and sub-combinations of the various processes, systems and configurations, and other features, functions, acts, and/or properties disclosed herein, as well as any and all equivalents thereof. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments.

In addition to the specific implementations explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware or software, or a combination of both.

What is claimed:

1. A method comprising:
   receiving data representative of a user's captured motion;
   collecting a history of the data representative of the user's captured motion;
   identifying a physical characteristic of the user in the history of the data representative of the user's captured motion;
   analyzing the received data with base information representing a gesture to produce an output corresponding to whether the received data corresponds to the gesture;
   performing a first adjustment to the base information representing the gesture to correspond to the physical characteristic of the user to form first adjusted base information; and
   performing a second adjustment to the base information representing the gesture to correspond to a physical characteristic of a different user to form second adjusted base information that is different from the first adjusted base information.

2. The method of claim 1, wherein performing the first adjustment to the base information comprises setting at least one parameter of a filter associated with the gesture to correspond to the physical characteristic of the user.

3. The method of claim 1, further comprising predicting an intended gesture from the received data using a filter associated with the intended gesture.

4. The method of claim 1, wherein the first adjusted base information indicates that the received data representative of the user's captured motion corresponds to the gesture.

5. The method of claim 1, wherein the physical characteristic of the user comprises at least one of the user's posture or the user's size.

6. The method of claim 5, wherein adjusting the base information to correspond to the physical characteristic of the user comprises setting at least one parameter of a filter associated with the gesture to correspond to the at least one of the user's posture or the user's size.

7. The method of claim 1, further comprising adjusting at least one property of a virtual object to correspond to the physical characteristic of the user.

8. The method of claim 7, wherein the physical characteristic of the user comprises the user's size and adjusting the at least one property of the virtual object to correspond to the physical characteristic of the user comprises scaling dimensions of the virtual object to correspond to the user's size.

9. The method of claim 1, wherein a filter associated with the gesture is a first filter and is complementary with at least one other filter, the method further comprising adjusting base information of the at least one other filter determined from the first adjustment.

10. The method of claim 9, wherein, prior to performing the first adjustment, the received data registers with the first filter, and wherein after performing the first adjustment and adjusting the base information of the at least one other filter, the received data registers with the at least one other filter.

11. A system comprising:
memory having stored therein computer-executable instructions;
one or more processors operable to execute the computer-executable instructions, and wherein the computer-executable instructions comprise instructions for:
receiving data representative of a user's captured motion;
collecting a history of the data representative of the user's captured motion;
identifying a physical characteristic of the user in the history of the data representative of the user's captured motion;
analyzing the received data with base information representing a gesture to produce an output corresponding to whether the received data corresponds to the gesture;
performing a first adjustment to the base information representing the gesture to correspond to the physical characteristic of the user to form first adjusted base information; and
performing a second adjustment to the base information representing the gesture to correspond to a physical characteristic of a different user to form second adjusted base information that is different from the first adjusted base information.

12. The system of claim 11, wherein performing the first adjustment to the base information comprises setting at least one parameter of a filter associated with the gesture to correspond to the physical characteristic of the user.

13. The system of claim 11, wherein the computer-executable instructions further comprise instructions for predicting an intended gesture from the received data using a filter associated with the intended gesture.

14. The system of claim 11, wherein the first adjusted base information indicates that the received data representative of the user's captured motion corresponds to the gesture.

15. The system of claim 11, wherein the physical characteristic of the user comprises at least one of the user's posture or the user's size.

16. The system of claim 15, wherein adjusting the base information to correspond to the physical characteristic of the user comprises setting at least one parameter of a filter associated with the gesture to correspond to the at least one of the user's posture or the user's size.

17. A computer-readable storage device having stored thereon computer-executable instructions comprising instructions for:
receiving data representative of a user's captured motion;
collecting a history of the data representative of the user's captured motion;
identifying a physical characteristic of the user in the history of the data representative of the user's captured motion;
analyzing the received data with base information representing a gesture to produce an output corresponding to whether the received data corresponds to the gesture;
performing a first adjustment to the base information representing the gesture to correspond to the physical characteristic of the user to form first adjusted base information; and
performing a second adjustment to the base information representing the gesture to correspond to a physical characteristic of a different user to form second adjusted base information that is different from the first adjusted base information.

18. The computer-readable storage device of claim 17, wherein performing the first adjustment to the base information comprises setting at least one parameter of a filter associated with the gesture to correspond to the physical characteristic of the user.

19. The computer-readable storage device of claim 17, wherein the computer-executable instructions further comprise instructions for predicting an intended gesture from the received data using a filter associated with the intended gesture.

20. The computer-readable storage device of claim 17, wherein the first adjusted base information indicates that the received data representative of the user's captured motion corresponds to the gesture.

21. The computer-readable storage device of claim 17, wherein the physical characteristic of the user comprises at least one of the user's posture or the user's size.

* * * * *